United States Patent
Stephenson

(10) Patent No.: US 10,599,231 B2
(45) Date of Patent: Mar. 24, 2020

(54) TILT AND POSITION COMMAND SYSTEM FOR INPUT PERIPHERALS

(71) Applicant: David A. Stephenson, Norfolk, VA (US)

(72) Inventor: David A. Stephenson, Norfolk, VA (US)

(*) Notice: Subject to any disclaimer, the term of this patent is extended or adjusted under 35 U.S.C. 154(b) by 0 days.

(21) Appl. No.: 15/249,658

(22) Filed: Aug. 29, 2016

(65) Prior Publication Data

US 2016/0364018 A1 Dec. 15, 2016

Related U.S. Application Data

(63) Continuation of application No. 14/635,374, filed on Mar. 2, 2015, now abandoned, which is a continuation of application No. 13/042,401, filed on Mar. 7, 2011, now abandoned.

(60) Provisional application No. 61/339,704, filed on Mar. 8, 2010.

(51) Int. Cl.
G06F 3/03 (2006.01)
G06F 3/0346 (2013.01)
G06F 3/0354 (2013.01)

(52) U.S. Cl.
CPC ........ G06F 3/0346 (2013.01); G06F 3/03543 (2013.01)

(58) Field of Classification Search
CPC .. G06F 3/0346; G06F 3/03543; G06F 3/0354; G06F 3/033; G01J 3/0278; Y02B 60/1253
USPC ......................................... 345/163, 158–159
See application file for complete search history.

(56) References Cited

U.S. PATENT DOCUMENTS

| | | | |
|---|---|---|---|
| 5,355,148 A | 10/1994 | Anderson | |
| 5,367,631 A * | 11/1994 | Levy | G06F 3/03543 345/163 |
| 5,473,345 A | 12/1995 | Dorst | |
| 5,701,175 A | 12/1997 | Kostizak | |
| 5,877,748 A * | 3/1999 | Redlich | G06F 3/011 345/159 |
| 5,883,803 A | 3/1999 | Vann | |
| 6,115,028 A | 9/2000 | Balakrishnan et al. | |
| 6,369,797 B1 | 4/2002 | Maynard, Jr. | |
| 6,844,871 B1 | 1/2005 | Hinckley et al. | |
| 6,870,526 B2 | 3/2005 | Zngf | |
| 7,075,516 B2 | 7/2006 | Bohn | |
| 7,079,110 B2 | 7/2006 | Ledbetter et al. | |
| 7,098,892 B2 | 8/2006 | Bohn | |
| 7,152,014 B2 | 12/2006 | Bang et al. | |
| 7,187,358 B2 | 3/2007 | Ledbetter et al. | |
| 7,205,977 B2 | 4/2007 | Ledbetter et al. | |
| 7,233,318 B1 | 6/2007 | Farag et al. | |
| 7,355,587 B2 | 4/2008 | Hinckley et al. | |
| RE40,324 E | 5/2008 | Crawford | |
| 7,403,220 B2 | 7/2008 | MacIntosh et al. | |

(Continued)

FOREIGN PATENT DOCUMENTS

WO 198601319 A1 2/1986
WO 199423358 A1 10/1994

(Continued)

*Primary Examiner* — Tony O Davis
(74) *Attorney, Agent, or Firm* — Goodman Allen Donnelly PLLC; Matthew R. Osenga, Esq.

(57) ABSTRACT

A tilt command system for input peripherals is disclosed which allows for enhanced functionality for a peripheral device based on the peripheral's degree of tilt and direction of tilt.

20 Claims, 36 Drawing Sheets

(56) References Cited

U.S. PATENT DOCUMENTS

| | | |
|---|---|---|
| 7,510,477 B2 | 3/2009 | Argentar |
| 8,139,031 B2 * | 3/2012 | Calarco .................. G05G 9/047 |
| | | 345/158 |
| 8,482,517 B1 | 7/2013 | O'Keefe |
| 2002/0036660 A1 | 3/2002 | Adan et al. |
| 2004/0012561 A1 | 1/2004 | Zngf |
| 2004/0263476 A1 | 12/2004 | Lim et al. |
| 2006/0092133 A1 | 5/2006 | Touma et al. |
| 2006/0250353 A1 | 11/2006 | Yasutake |
| 2006/0281453 A1 * | 12/2006 | Jaiswal ................. G06F 1/1626 |
| | | 455/423 |
| 2007/0171204 A1 | 7/2007 | Afriat |
| 2008/0100574 A1 | 5/2008 | Lou et al. |
| 2008/0148335 A1 | 6/2008 | Dawson et al. |
| 2008/0192010 A1 | 8/2008 | Lin |
| 2008/0259028 A1 | 10/2008 | Teepell et al. |
| 2008/0268931 A1 * | 10/2008 | Alderucci ........... G07F 17/3209 |
| | | 463/11 |
| 2008/0297475 A1 | 12/2008 | Woolf et al. |
| 2008/0300055 A1 * | 12/2008 | Lutnick .............. G06K 9/00375 |
| | | 463/39 |
| 2009/0073121 A1 | 3/2009 | Nikfarjam et al. |
| 2009/0122012 A1 | 5/2009 | Bohn |
| 2009/0213077 A1 | 8/2009 | Bailen |
| 2009/0289897 A1 | 11/2009 | Fahlman |
| 2010/0013768 A1 | 1/2010 | Leung |
| 2010/0039381 A1 | 2/2010 | Cretella et al. |
| 2010/0138766 A1 | 6/2010 | Nakajima |
| 2011/0216004 A1 * | 9/2011 | Stephenson ............. G06F 3/033 |
| | | 345/163 |

FOREIGN PATENT DOCUMENTS

| | | |
|---|---|---|
| WO | 2001018781 A1 | 3/2001 |
| WO | 2006121649 A1 | 11/2006 |
| WO | 2007082348 A1 | 7/2007 |
| WO | 2008025973 A2 | 3/2008 |

\* cited by examiner

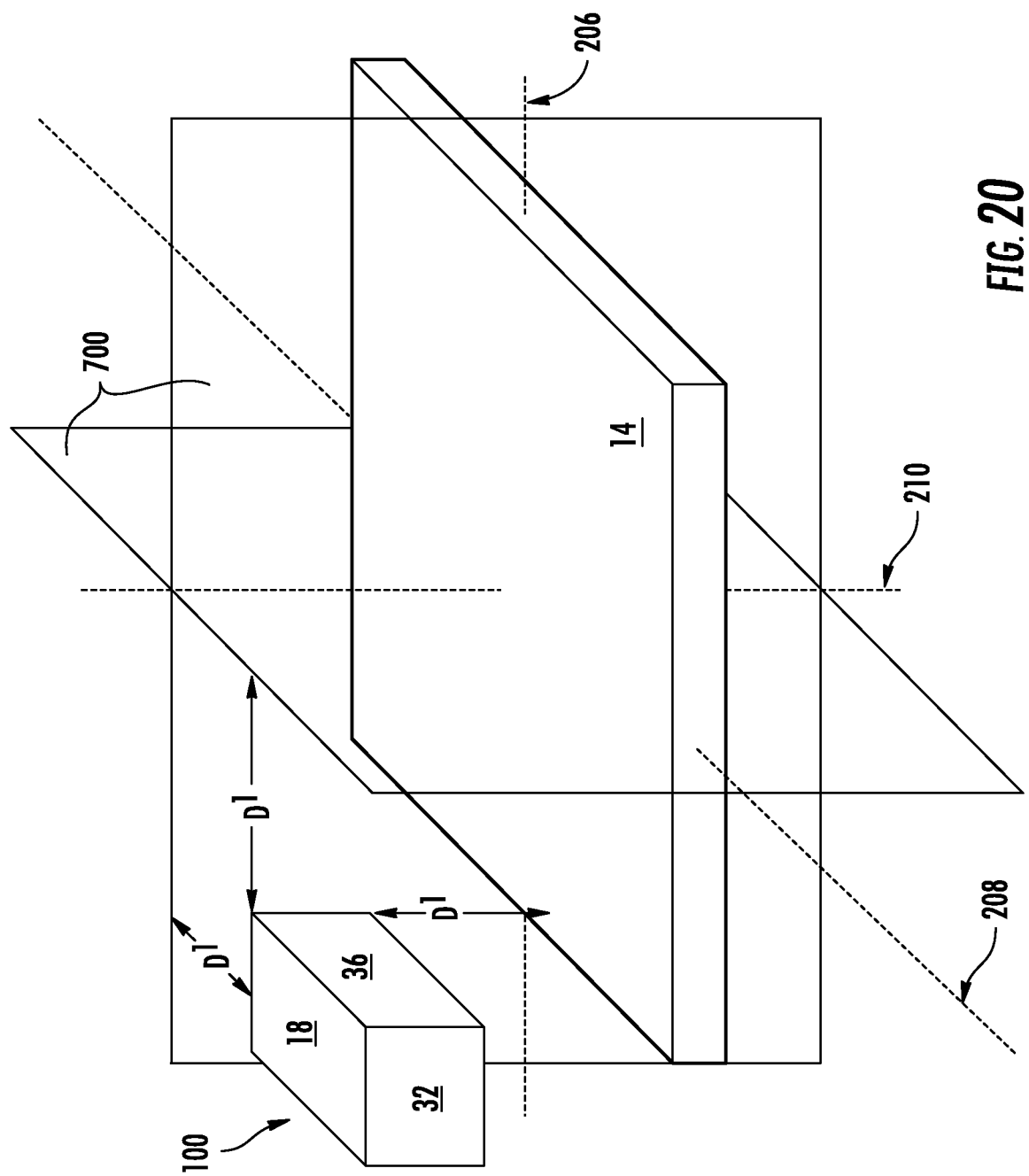

TILT AND POSITION COMMAND SYSTEM FOR INPUT PERIPHERALS

CROSS-REFERENCE TO RELATED APPLICATIONS

This application is a continuation of U.S. application Ser. No. 14/635,374, filed Mar. 2, 2015, which is a continuation of U.S. application Ser. No. 13/042,401, filed Mar. 7, 2011, which application claims the benefit of U.S. Provisional Application No. 61/339,704, filed Mar. 8, 2010, the contents of which are hereby incorporated by reference. This application is also related to U.S. Provisional Application No. 61/199,294 filed Nov. 14, 2008, the content of which is hereby incorporated by reference.

FIELD OF THE INVENTION

This invention relates in general to computer and electronic device peripherals. Embodiments of this invention relate to input peripherals for computers, such as a computer mouse.

BACKGROUND OF THE INVENTION

Many computers and electronic devices require the use of input peripherals in order to allow a user to enact control over the device. In general, one of the most ubiquitous input peripherals in existence today is the computer mouse. Nearly every personal computer sold or used today uses a keyboard-mouse combination for input. Children and adults are taught today to use computers via keyboard and mouse peripherals. However, use of a computer mouse has traditionally been limited to X-Y tracking and button clicks. The addition of the scroll wheel, now a common part of most computer mice, gave the user additional control over the computing environment in a convenient way that did not necessitate the user moving his or her hand away from the mouse that was already in use.

Since the computer mouse is still in wide use today and will likely remain in wide use in the future, there is a need for a computer mouse that can utilize additional, convenient controls.

Additionally, it is understood that any additional, convenient controls used in such a computer mouse can be adapted for use in many other computer and electronic peripherals, including but not limited to use in remote controls for toys, remote controls for video equipment, and navigation controls for vehicles.

SUMMARY OF THE INVENTION

The invention provides various exemplary embodiments, including devices, systems, and methods for computer and electronic device system peripherals.

These and other features and advantages of the invention are described below with reference to the accompanying drawings.

BRIEF DESCRIPTION OF THE DRAWINGS

FIG. 20 is a three dimensional representation of a peripheral device above a supporting surface depicting position tracking.

DETAILED DESCRIPTION

Figure 1:
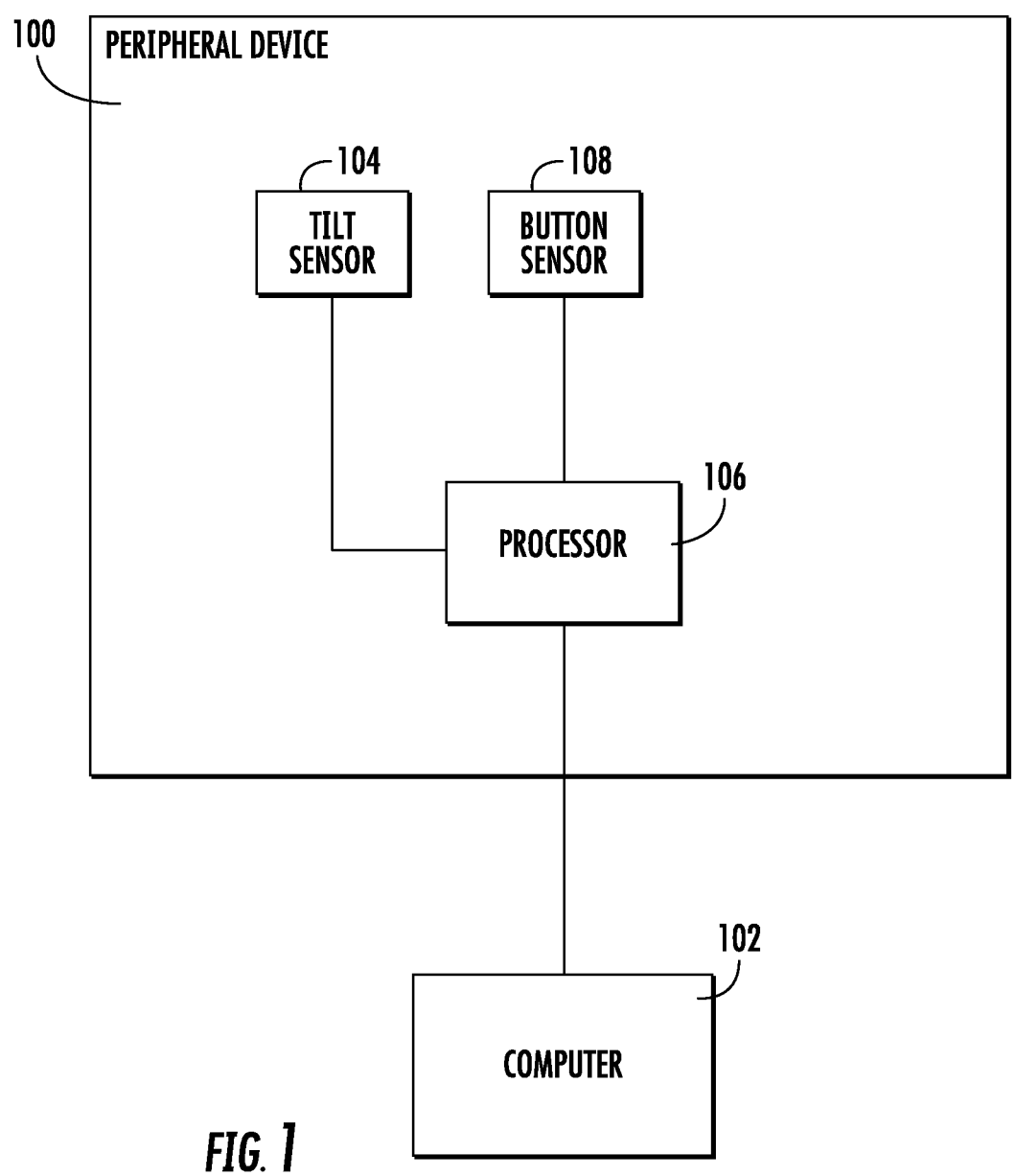
FIG. 1 is a schematic representation of a peripheral device connected to a computer.

The following description is merely exemplary in nature and is not intended to limit the present disclosure, application, or uses. It should be understood that throughout the drawings, corresponding reference numerals indicate like or corresponding parts and features.

Numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the claims.

A peripheral device 100 is disclosed that is capable of sensing an amount of longitudinal and/or lateral tilt. The peripheral device 100 is capable of performing various functions, some of which differ depending on the degree and type of tilt detected.

System Components

Figure 2:
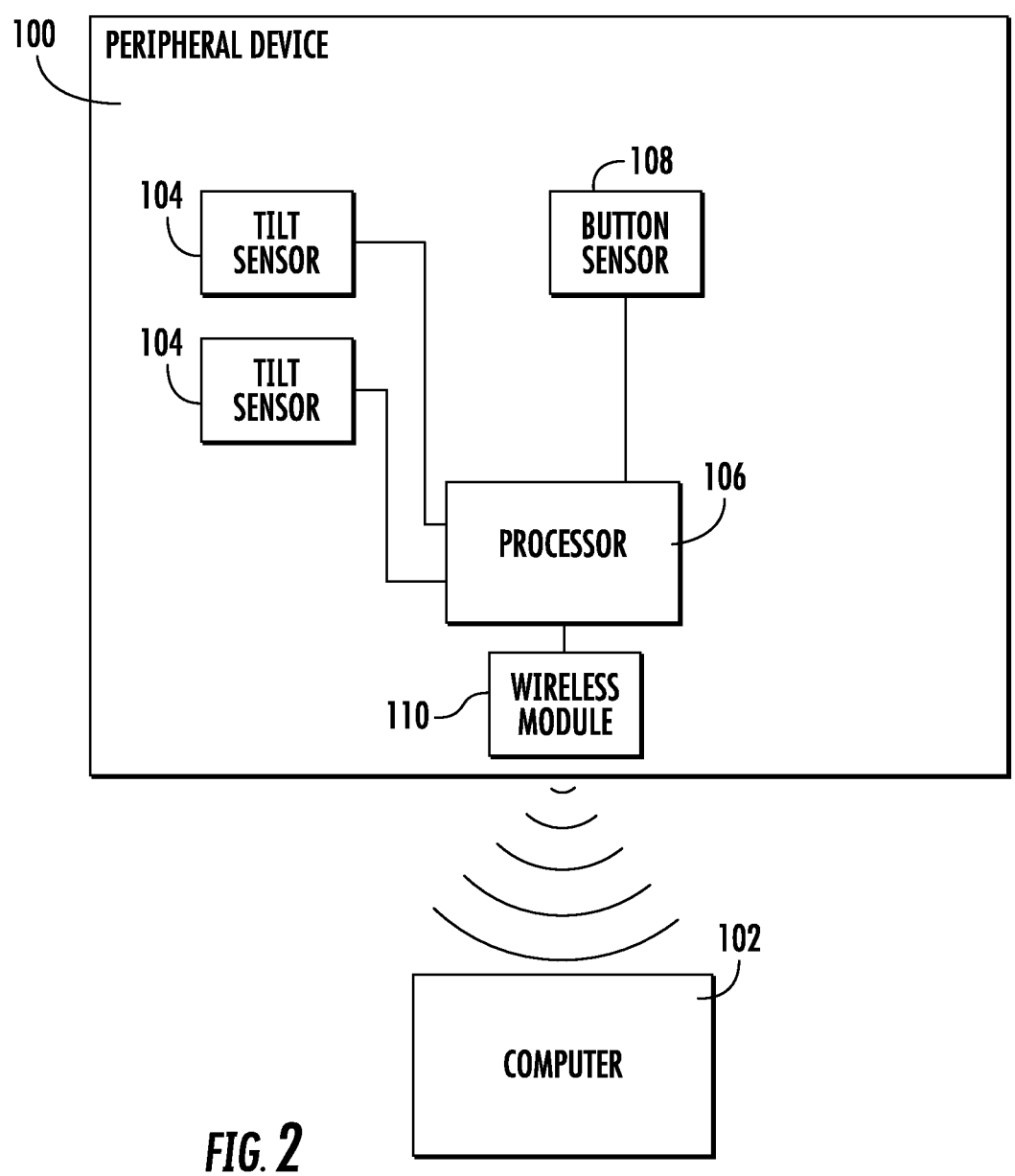
FIG. 2 is a schematic representation of a peripheral device connected to a computer.

As shown in FIGS. 1 and 2, an embodiment of the peripheral device 100 may be used with a computer 102. The peripheral device itself contains at least one tilt sensor 104, and at least one processor 106. As shown in FIG. 1, the processor 106 may be physically connected to the computer 102, such as in the case of a wired mouse. As shown in FIG. 2, the processor 106 may be connected to computer 102 by way of a wireless module 110. In such an embodiment, the peripheral device 100 may operate wirelessly, such as in the case of a wireless mouse.

It is understood that the detected tilt from the one or more tilt sensors 104 can be integrated into the data being sent to the computer 102, or can be used by the processor 106 without being sent to the computer 102. In some embodiments, the peripheral device 100 may interact with a piece of hardware attached to the computer 102, the piece of hardware designed to send signals to the computer 102 based on the tilting and/or button events of the peripheral device 100.

Figure 3:
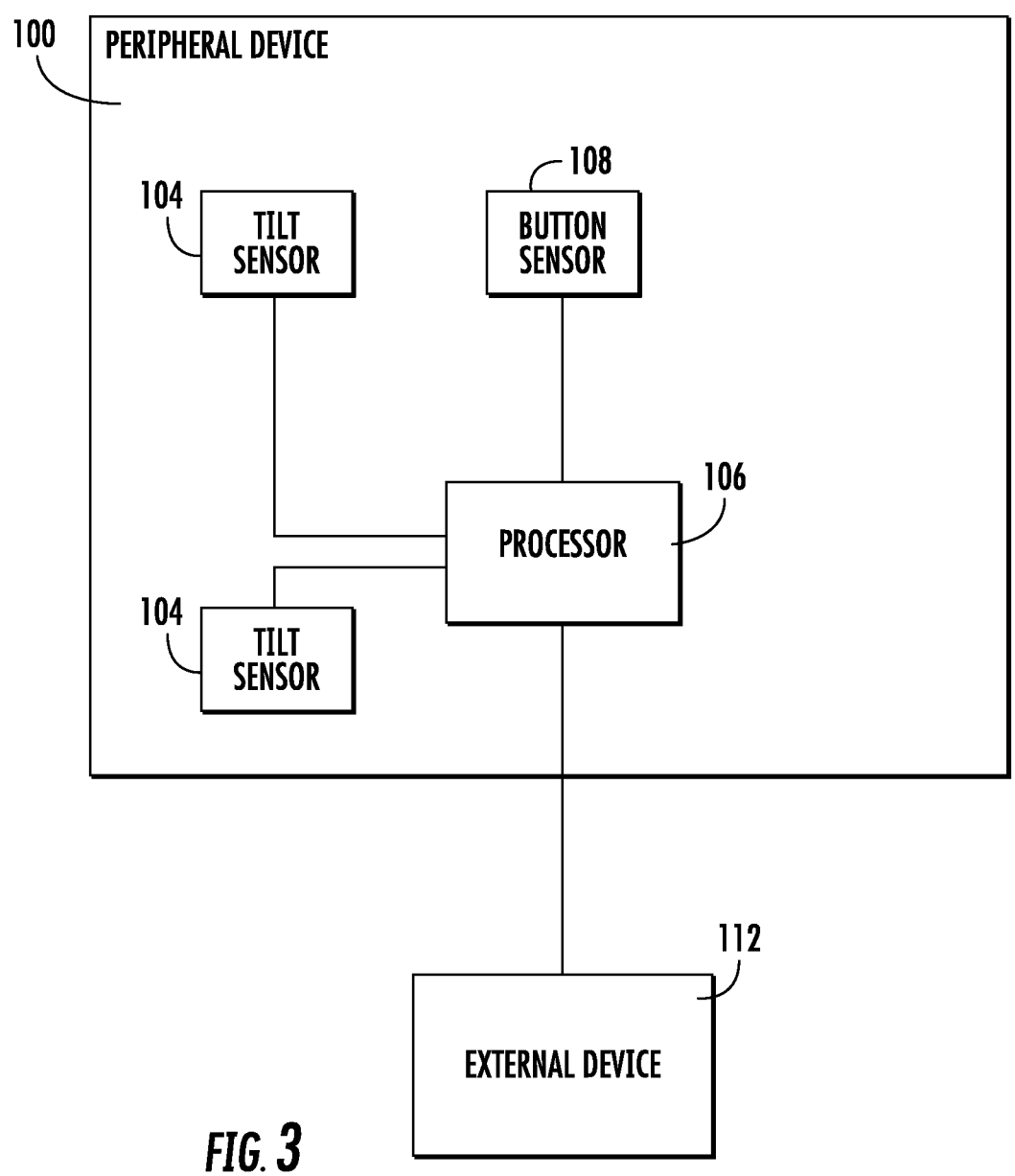
FIG. 3 is a schematic representation of a peripheral device connected to an external device.

Referring to FIG. 3, an embodiment may include a peripheral device 100 connected to an external device 112 by wire or wirelessly. This external device 112 may be a computer or may be a non-computer device that accepts analog or digital input from the processor 106. For example, the external device 112 may be a television screen or an analog electrical circuit.

Figure 4:
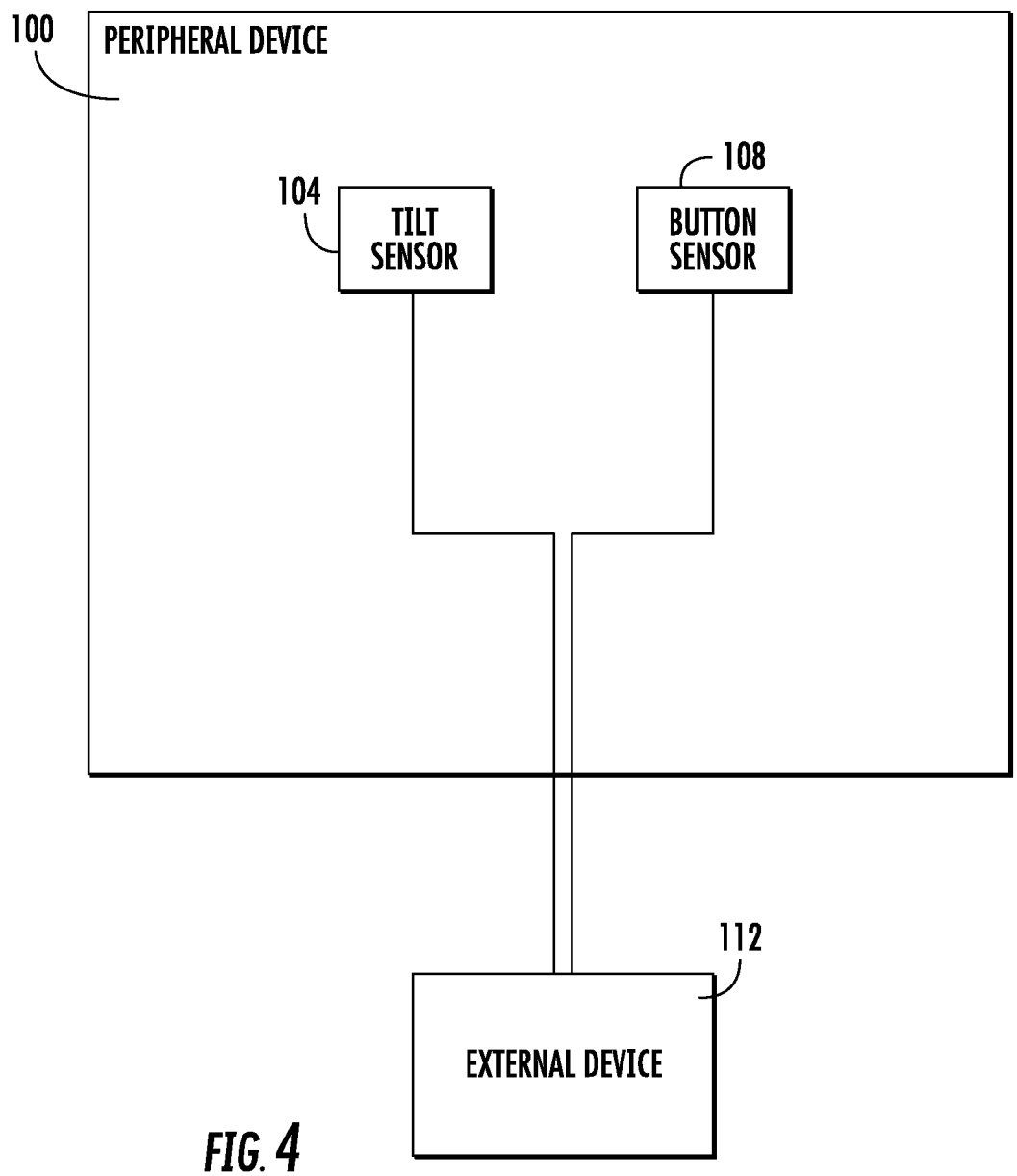
FIG. 4 is a schematic representation of a peripheral device connected to an external device.

Referring to FIG. 4, an embodiment is shown where the peripheral device 100 is connected to the external device 112 without the presence of a processor 106. At least one tilt sensor 104 and at least one button sensor 108 are connected to the external device 112, which may be a computer or non-computer device, as described above.

Tilt Detection

As used herein, many examples will be made with reference to the longitudinal tilt angle $\theta$. It is understood that those examples may often be likewise appropriate for use with lateral tilt angle $\alpha$ and vertical tilt angle $\varphi$.

Figure 5:
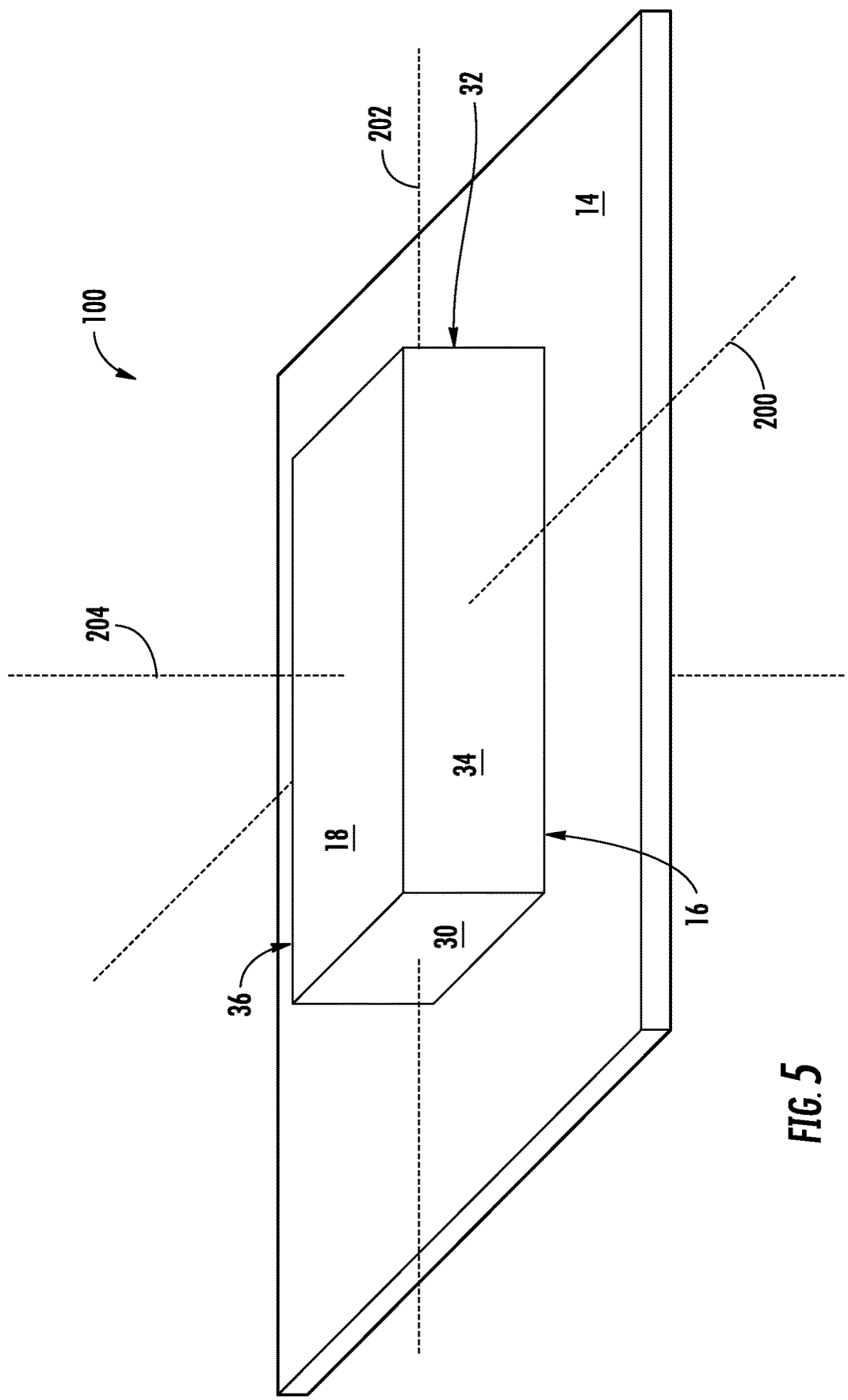
FIG. 5 is a three dimensional representation of a peripheral device over a supporting surface showing the longitudinal, lateral, and vertical axes of the peripheral device.

Referring to FIG. 5, the peripheral device 100 is intersected by a peripheral lateral axis 200, a peripheral longitudinal axis 202, and a peripheral vertical axis 204. As viewed in FIG. 5, the negative portion of the peripheral lateral axis 200 extends towards the top left of the figure, while the positive portion extends towards the bottom right of the figure; the negative portion of the peripheral longitudinal axis 202 extends towards the left of the figure, while the positive portion extends towards the right of the figure. As viewed in FIG. 5, the negative portion of the peripheral vertical axis 204 extends towards the bottom of the figure, while the positive portion extends towards the top of the figure.

Referring to FIG. 5, the peripheral device 100 has at least six general surfaces: a top surface 18, a bottom surface 16, a front surface 30, a rear surface 32, a left surface 34, and a right surface 36. As used herein, the top surface 18 refers to that portion of the peripheral device 100 that is facing towards the positive direction of the peripheral vertical axis 204; the bottom surface 16 refers to that portion of the peripheral device 100 that is facing towards the negative direction of the peripheral vertical axis 204; the rear surface 32 refers to that portion of the peripheral device 100 that is facing towards the positive direction of the peripheral longitudinal axis 202; the front surface 30 refers to that portion of the peripheral device 100 that is facing towards the negative direction of the peripheral longitudinal axis 202; the right surface 36 refers to that portion of the peripheral device 100 that is facing towards the positive direction of the peripheral lateral axis 200; the left surface 34 refers to that portion of the peripheral device 100 that is facing towards the negative direction of the peripheral lateral axis 200.

In some embodiments, the peripheral device 100 may have fewer or more surfaces than those shown in FIG. 5. In such embodiments, the peripheral device 100 may have curved or faceted surfaces. When a peripheral device 100 has curved surfaces, portions of a curved surface may be referred to as one or more of the general surfaces described above, depending upon which direction that curved surface may face. When a peripheral device 100 has faceted surfaces, a single general surface as described above may refer to a plurality of faceted surfaces, depending on which direction the faceted surfaces face. Both a single curved surface and a single faceted surface may individually be referred to by multiple general surfaces, depending on which direction the surface faces.

As shown in FIGS. 1-4, the peripheral device 100 incorporates at least one tilt sensor 104. A tilt sensor 104 may take many forms as long as it is capable of detecting the rotation of the peripheral device 100 around at least one of the peripheral lateral axis 200, the peripheral longitudinal axis 202, or the peripheral vertical axis 204, shown in FIG. 5. A single tilt sensor 104 or multiple tilt sensors 104 may be used to detect the rotation of the peripheral device 100 around more than one of the peripheral lateral axis 200, the peripheral longitudinal axis 202, or the peripheral vertical axis 204. Each tilt sensor 104 may incorporate an accelerometer, a pressure sensor, a laser light, a magnetic sensor, an electric sensor, a RADAR sensor, an acoustic sensor, or other mechanical or electromagnetic sensors. The tilt sensor 104 may be located within the device, or may be located external to the device. In some embodiments, the tilt sensor 104 may be a spring-biased actuator that converts rotational movement into tilt detection.

Figure 6A:
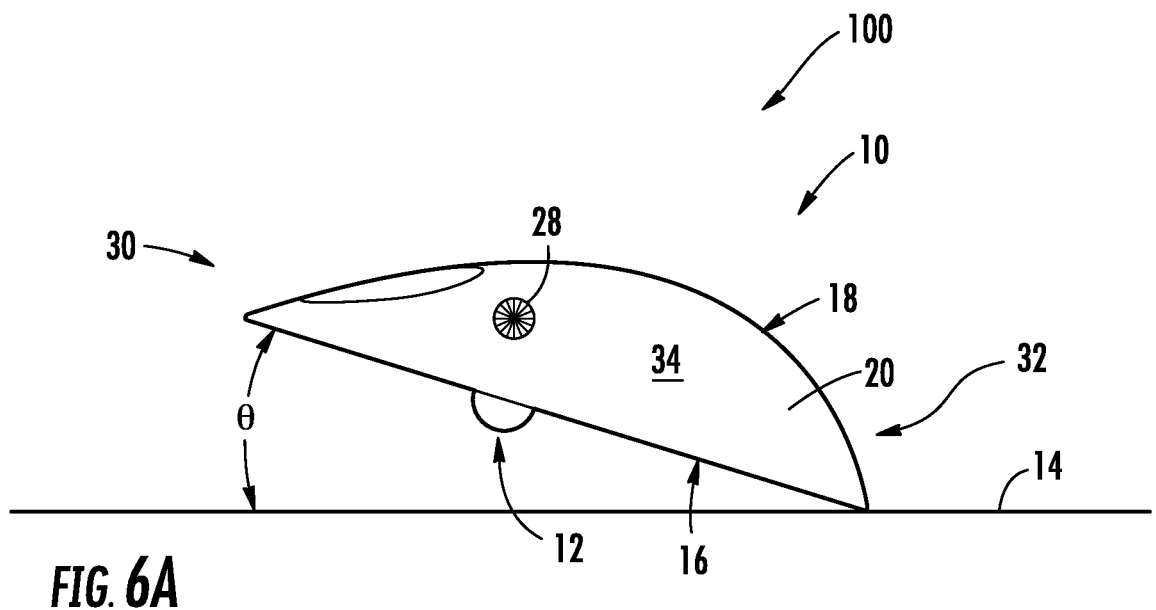
FIG. 6A is a side view representation of a peripheral device above a surface being tilted longitudinally to angle θ.

Referring to FIG. 6A, an embodiment of a peripheral device 100 is shown as a computer mouse 10. It is understood by those having ordinary skill in the art that the disclosure produced herein of a peripheral device 100 in the form of a computer mouse may be applied to a peripheral device 100 in various other non-computer mouse forms. Where appropriate, references to aspects of a computer mouse form in this disclosure should be understood as equivalent references for non-computer mouse forms.

Figure 6B:
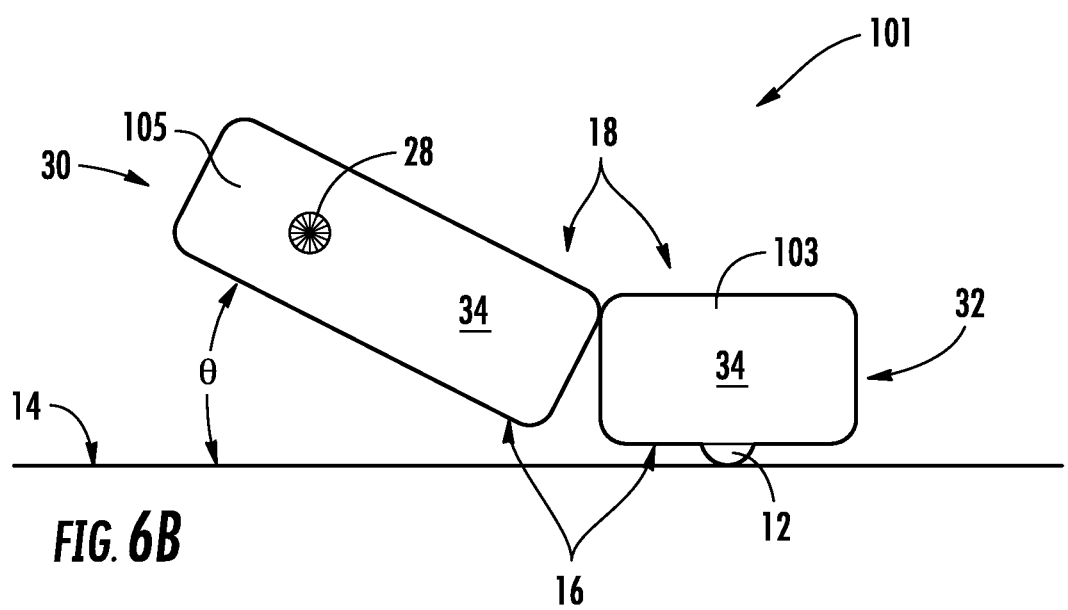
FIG. 6B is a side view representation of a split peripheral device above a surface being tilted longitudinally to angle θ.

In the embodiment shown in FIG. 6B, the peripheral device 100 may be a split peripheral device 101. A split peripheral device 101 may have a tilting portion 105 and a non-tilting portion 103. The non-tilting portion 103 is designed to be able to remain in contact with the support surface 14 while the tilting portion 105 is lifted to a certain tilt angle. In such embodiments, the X-Y sensor 12 can be positioned in the non-tilting portion 103 so that a user can control X-Y movement while also controlling tilting movement. As shown in FIG. 6B, the tilting movement is longitudinal tilt in the backwards direction. It is understood that the tilting portion 105 of the split peripheral device 101 may be hinged or attached so that it may tilt in a lateral tilt direction or may twist in a lateral twist direction, all while the non-tilting portion 103 remains substantially stationary or in contact with the support surface 14.

Tilt and twist may be measured in a number of different ways, a number of examples of which are given herein. For example, in one embodiment, the peripheral device 100 would house one or more accelerometers. In another example, the peripheral device 100 would use an inclinometer to measure tilt. In still another example, the peripheral device 100 would use a spherical spirit-level to measure tilt. In another example, the peripheral device 100 may use laser light, other light, radio waves, sound waves, or other electromagnetic waves to measure twist or tilt by reflecting the laser light, other light, radio waves, sound waves, or other electromagnetic waves off of a surface to measure distance. In another example, the peripheral device 100 may use an electric sensor to measure tilt or twist, or to simply measure when peripheral device 100 has left contact with the support surface 14. In another example, the peripheral device 100 may use a magnetic sensor to measure tilt or twist by using magnetic fields to determine distance. In another example, the peripheral device 100 uses an optical sensor to determine position, tilt, and twist. In another example, the peripheral device 100 may use GPS to measure position, tilt, and twist. In some embodiments, the position, tilt, or twist of the peripheral device 100 may be measured by a tilt sensor 104 located in an external object which correlates its tilt with respect to the position of the peripheral device 100.

Figure 8A:
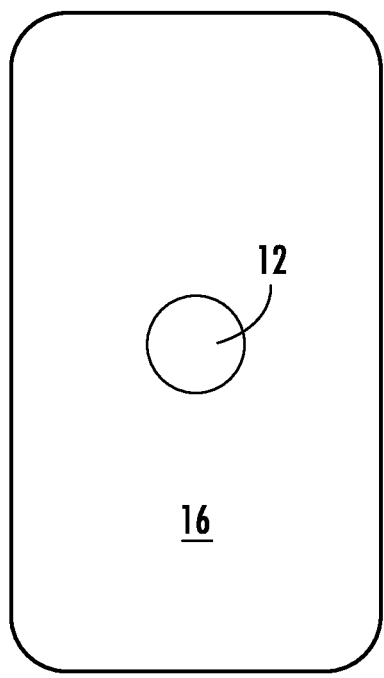
FIG. 8A is a bottom view representation of a peripheral device.
Figure 8B:
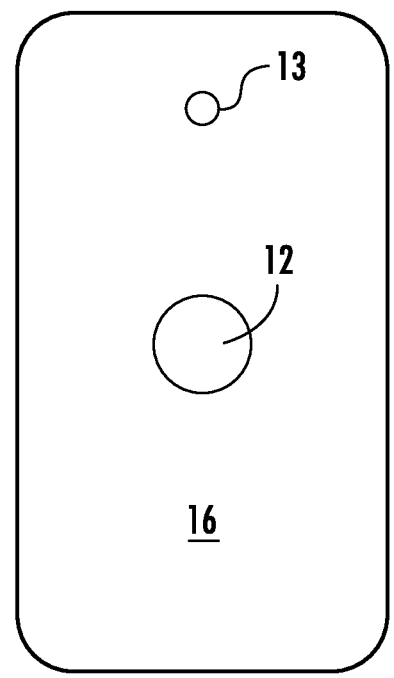
FIG. 8B is a bottom view representation of a peripheral device.

Referring to FIGS. 8A-8B, the bottom surface 16 of the peripheral device 100 may contain an X-Y sensor 12. This X-Y sensor 12 may be a trackball, an optical sensor, or another type of sensor. In the embodiment shown in FIG. 8B, the peripheral device 100 may contain a bottom sensor 13. In some embodiments, the bottom sensor 13 may be a tilt sensor, such as a light sensor, a RADAR sensor, a sonar sensor, or another reflective-type sensor. The bottom sensor 13 may also be a pressure contact sensor that is capable of detecting when the bottom surface 16 of the peripheral device 100 has left contact with the support surface. It is understood that a peripheral device may have zero, one, or any number of bottom sensors 13.

Referring again to FIGS. 5, 6A, and 6B, an embodiment of a peripheral device 100 is shown with a grip point 28 on or near the left surface 34. The grip point 28 may be a recess, an extrusion, an area of different friction or texture properties, an area of different color or finish properties, a piece that is separate from the left surface 34, or any other area that can be used to facilitate a user gripping the peripheral device 100 at that point. The grip point 28 is shown as being positioned closer to the front surface 30 than to the rear surface 32. The grip point 28 is shown as being positioned closer to the top surface 18 than top the bottom surface 16. It will be understood that the position of the grip point 28 may be dependent upon ergonomic design and aesthetic appeal, and therefore the grip point 28 may be placed at different points along the left surface 34.

Figure 7:
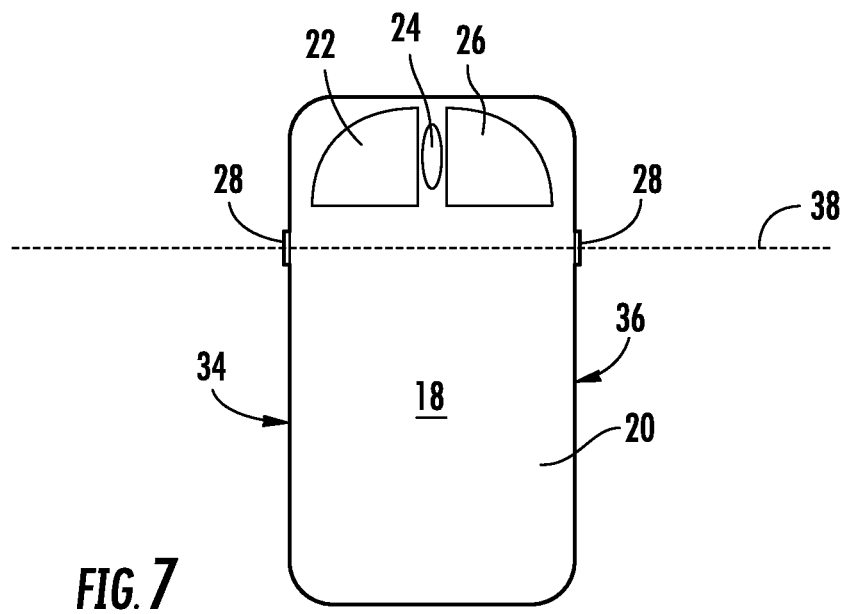
FIG. 7 is a top view representation of a peripheral device.

The grip point 28 shown in FIG. 6A is accompanied by a similar grip point (not shown) located in a similar location on the right surface 36. Ideally, the grip points 28 should be positioned on the left surface 34 and right surface 36 in such a way that a user's hand resting on the peripheral device 100 in a normal fashion will be able to easily grasp the grip points 28 between that user's thumb and another finger. As shown in FIG. 7, both grip points 28 depicted share a common grip point rotation axis 38. In other embodiments, the grip point rotation axes 38 of each individual grip point 28 may not be collinear or even parallel. It is understood that the grip points 28 may be located on any two opposing surfaces of the peripheral device 100 as long as there is a desire to rotate the peripheral device about the grip point rotation axes 38 of the grip points 28.

In some embodiments, the grip points 28 are mounted so that they are free to rotate with respect to the body of the peripheral device 100. Each grip point 28 would be mounted in a fashion that allowed it to rotate about its individual grip point rotation axis 38. In one embodiment, the both grip points 28 may be rotationally coupled together. In another embodiment, both grip points may share a common grip point rotation axis 38. In a further embodiment, when the peripheral device 100 is grasped by only the grip points 28, the peripheral device 100 would be free to rotate about the grip point rotation axes 38. As FIGS. 6A-6B may show, rotation about the grip point rotation axes 38 would result in the peripheral device 100 rotating so that the longitudinal tilt angle θ between the peripheral longitudinal axis 202 and the tare longitudinal axis 208 (described below and shown in FIG. 9) changes. The direction of change of the longitudinal tilt angle θ when the peripheral device 100 is lifted freely in this manner would depend on the location of the center of gravity (not shown) of the peripheral device 100 with respect to the grip point rotation axes 38.

Figure 9A:
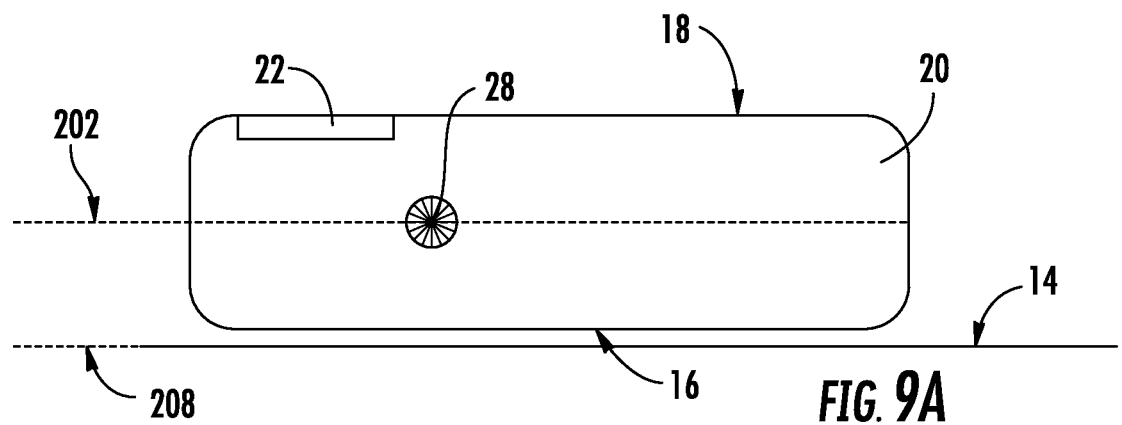
FIG. 9A is a side view representation of a peripheral device above a surface.
Figure 9B:
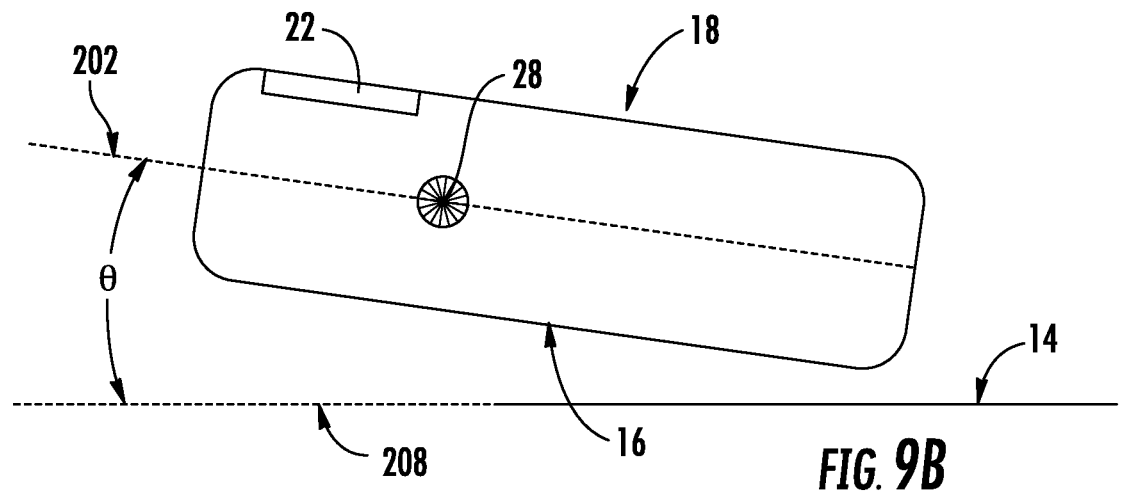
FIG. 9B is a side view representation of a peripheral device above a surface being tilted longitudinally to angle θ.
Figure 9C:
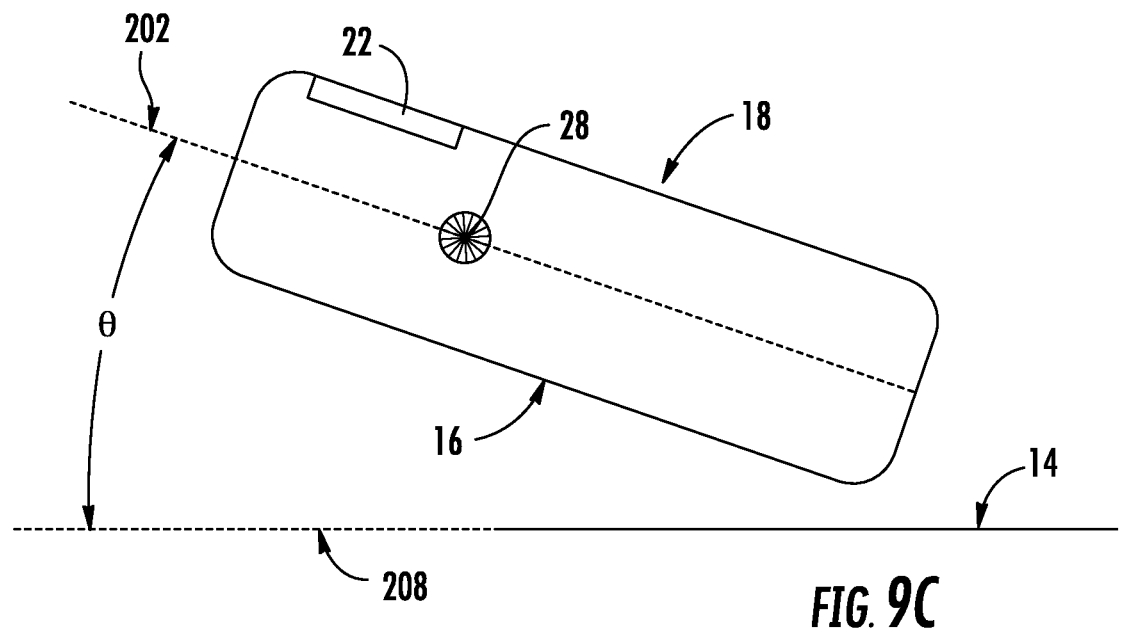
FIG. 9C is a side view representation of a peripheral device above a surface being tilted longitudinally to angle θ.
Figure 9D:
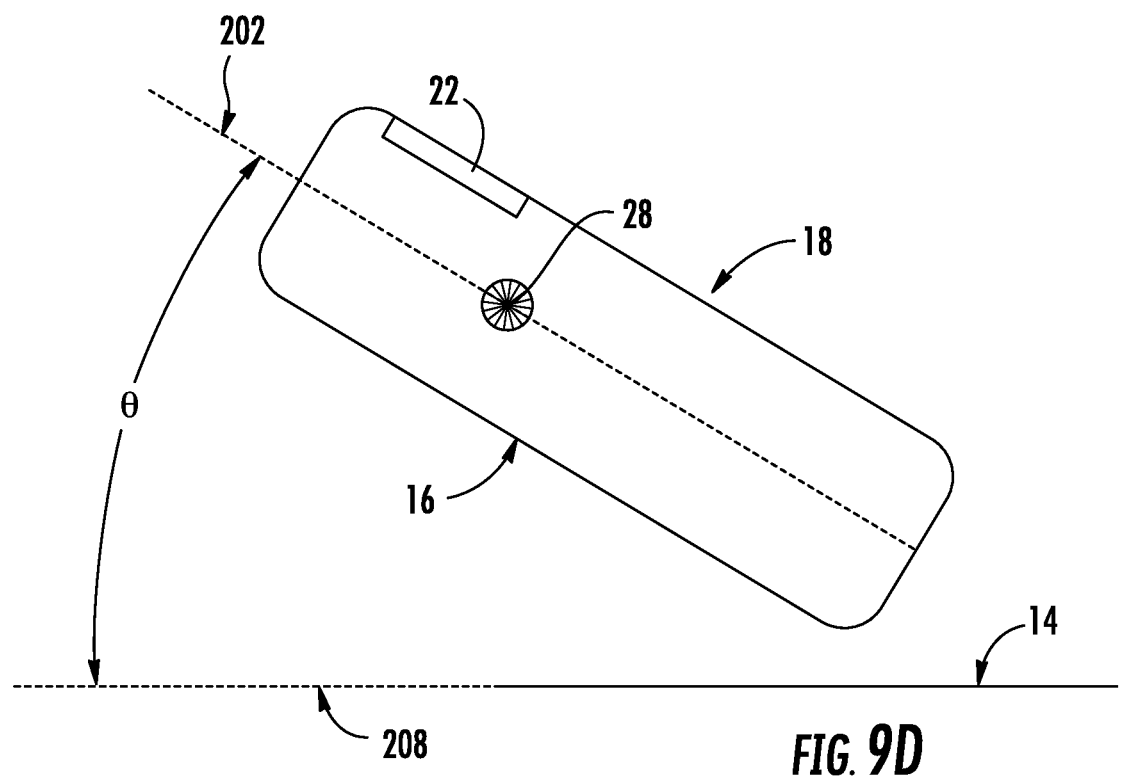
FIG. 9D is a side view representation of a peripheral device above a surface being tilted longitudinally to angle θ.
Figure 9E:
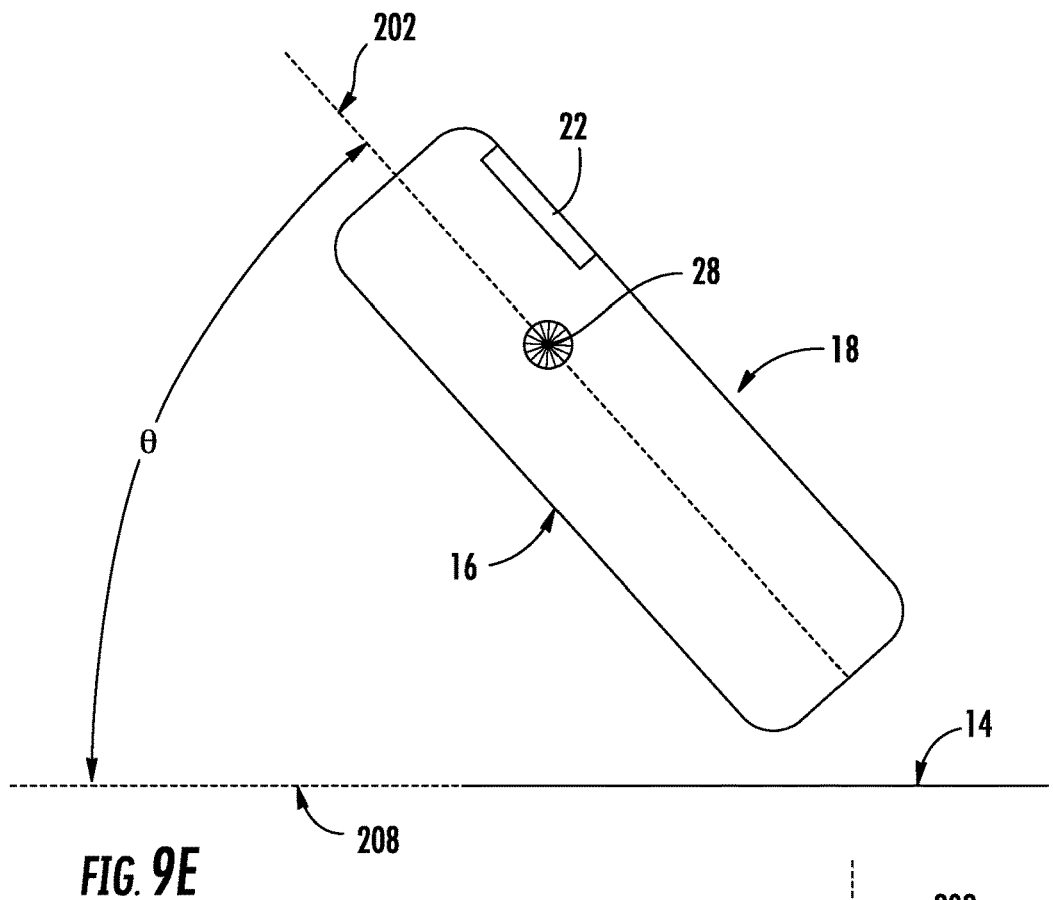
FIG. 9E is a side view representation of a peripheral device above a surface being tilted longitudinally to angle θ.

Referring to FIG. 9A, a peripheral device 100 is shown at rest on a support surface 14. The tare longitudinal axis 208 is a line located within the plane formed by the support surface 14 and parallel to the peripheral longitudinal axis 202. The tare longitudinal axis 208, as well as the tare lateral axis 206 and tare vertical axis 210 can be adjusted and recalibrated by software within the peripheral device 100, the computer 102, or the external device 112, shown in FIGS. 1-4. The recalibration may occur at constant intervals, may occur based on activity or inactivity of the peripheral device, or may occur on a user's request. In one embodiment, the peripheral device 100 would have a button that calls for the recalibration of the tare axes 206, 208, 210. In another embodiment, a pre-determined movement of the peripheral device 100 (e.g. shaking left and right repeatedly six times in under 1.5 seconds) may automatically call for the recalibration of the tare axes 206, 208, 210. Depending on the calibration, the tare axes (i.e. the tare longitudinal axis 208, the tare lateral axis 206, and the tare vertical axis 210, examples of which are shown in FIG. 20) may not always be coplanar, parallel, or perpendicular to the current support surface 14. In other words, it is possible to move and use the peripheral device 100 upon a support surface 14 for which the peripheral device 100 is not currently calibrated. Such usage may be useful for certain applications of the peripheral device 100.

Referring to FIGS. 9B-9J, the peripheral device 100 shown contains at least one tilt sensor 104 capable of detecting tilt along the peripheral longitudinal axis 202 (i.e. capable of detecting rotation about the peripheral lateral axis 200).

Figure 9F:
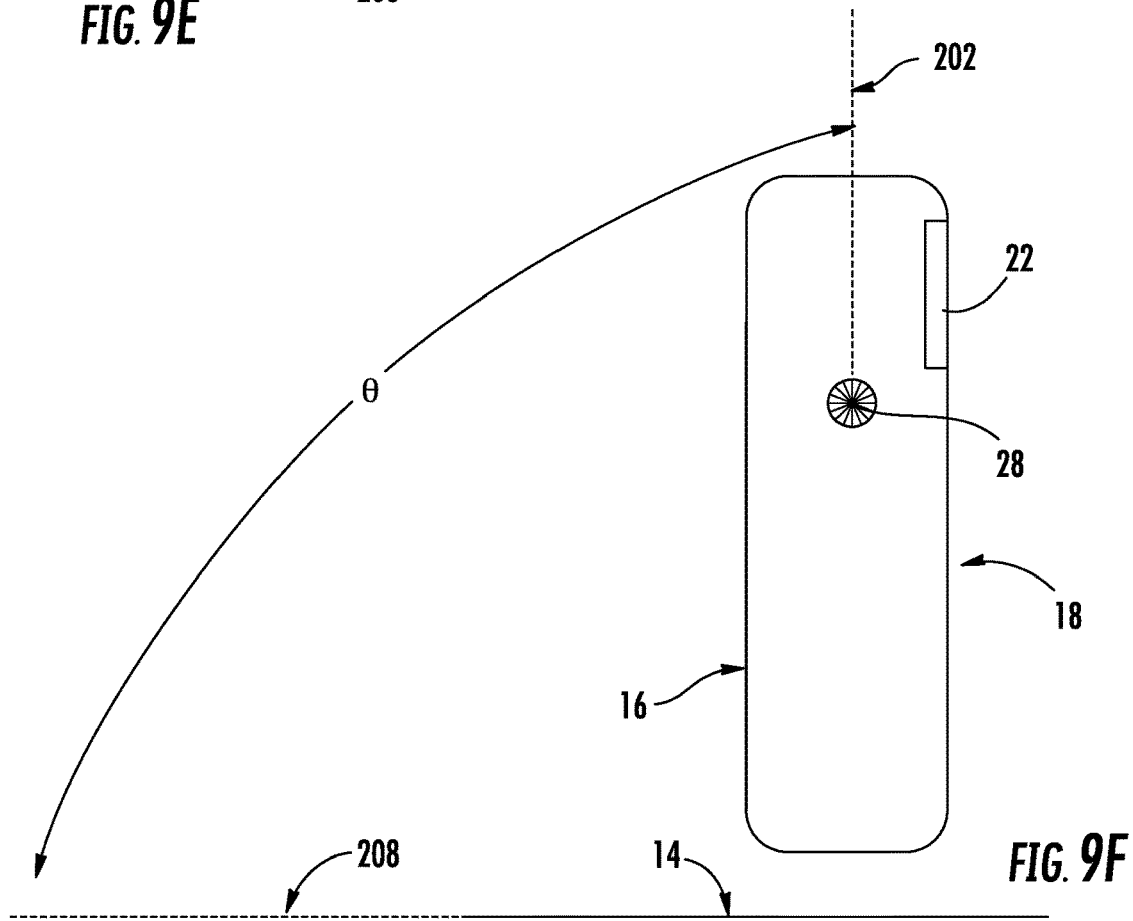
FIG. 9F is a side view representation of a peripheral device above a surface being tilted longitudinally to angle θ.

Referring to FIGS. 9B-9F, a peripheral device 100 is rotated to some positive longitudinal tilt angle θ, the longitudinal tilt angle θ increasing as the peripheral device 100 moves continuously between the positions shown in FIG. 9B, FIG. 9C, FIG. 9D, FIG. 9E, and then FIG. 9F. Increasing of the longitudinal tilt angle θ shall be referred to as "backwards tilting." The positions shown in FIGS. 9B-9F may be reached in a number of ways, including by grasping the peripheral device 100 by a point other than the grip points 28 and tilting the peripheral device 100, by grasping the peripheral device 100 by grip points 28 that are not rotatable and tilting the peripheral device 100, or by grasping the peripheral device 100 by grip points 28 that are rotatable where the center of gravity (not shown) of the peripheral device 100 is located between the grip point rotation axes 38 and the rear surface 32.

Figure 9G:
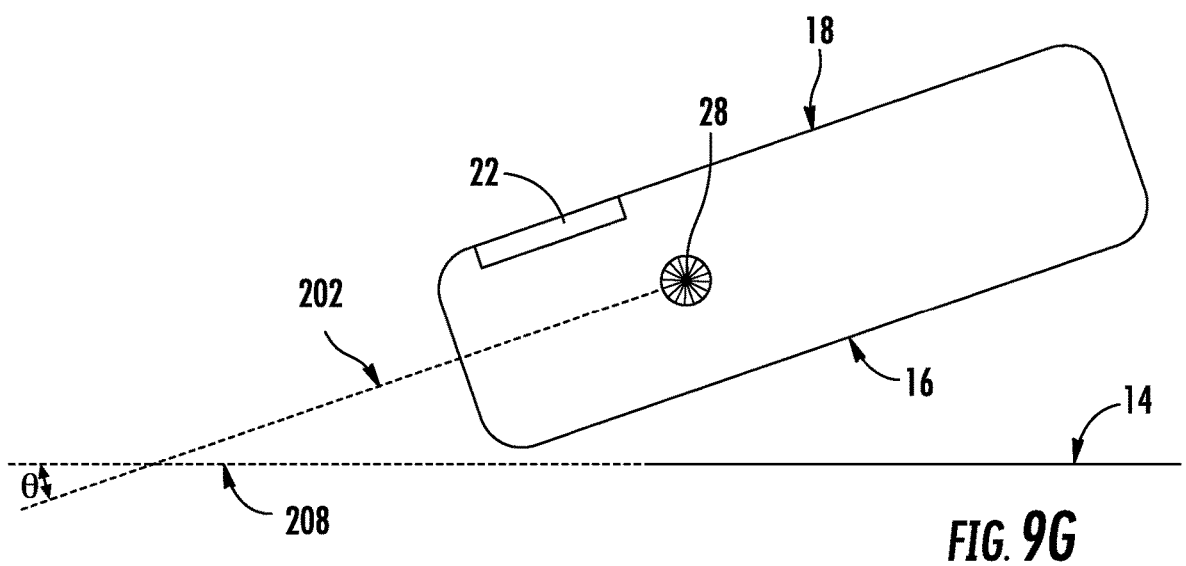
FIG. 9G is a side view representation of a peripheral device above a surface being tilted longitudinally to angle θ.
Figure 9H:
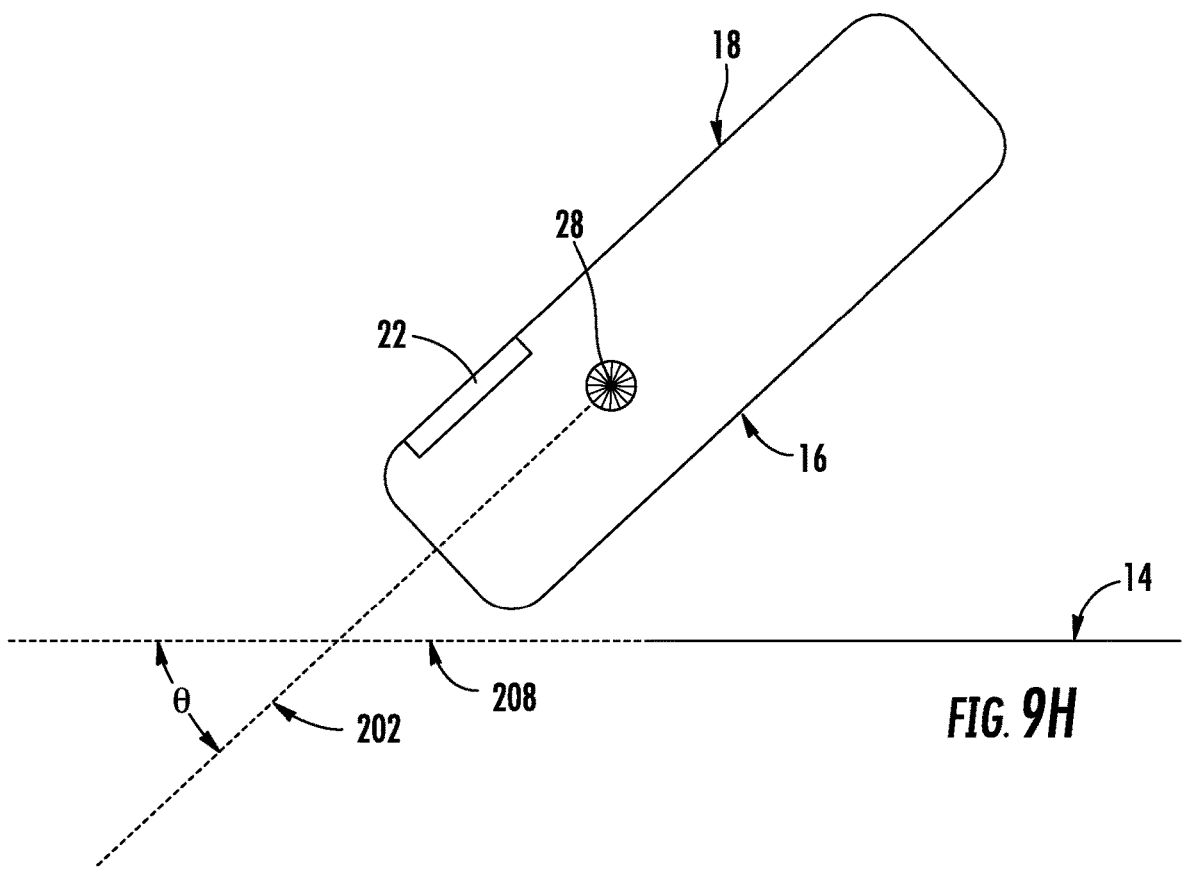
FIG. 9H is a side view representation of a peripheral device above a surface being tilted longitudinally to angle θ.
Figure 9I:
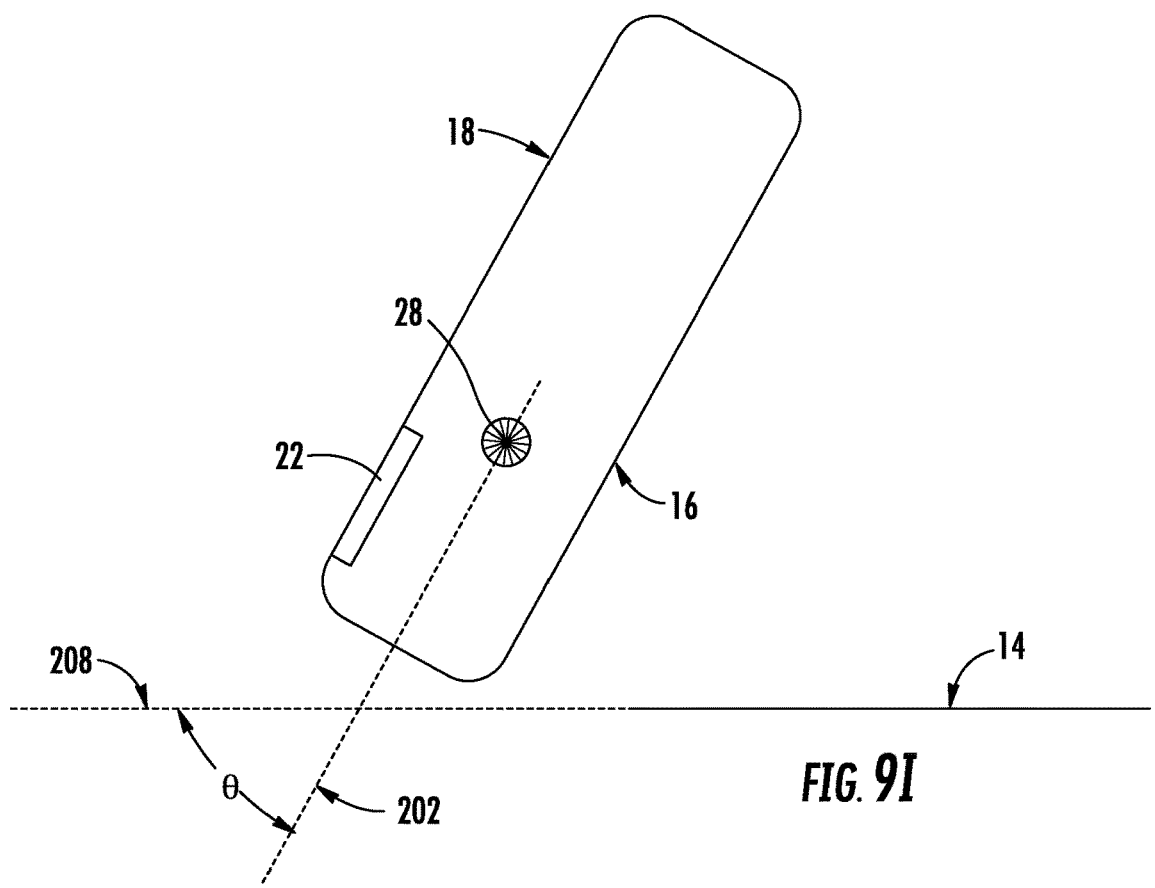
FIG. 9I is a side view representation of a peripheral device above a surface being tilted longitudinally to angle θ.
Figure 9J:
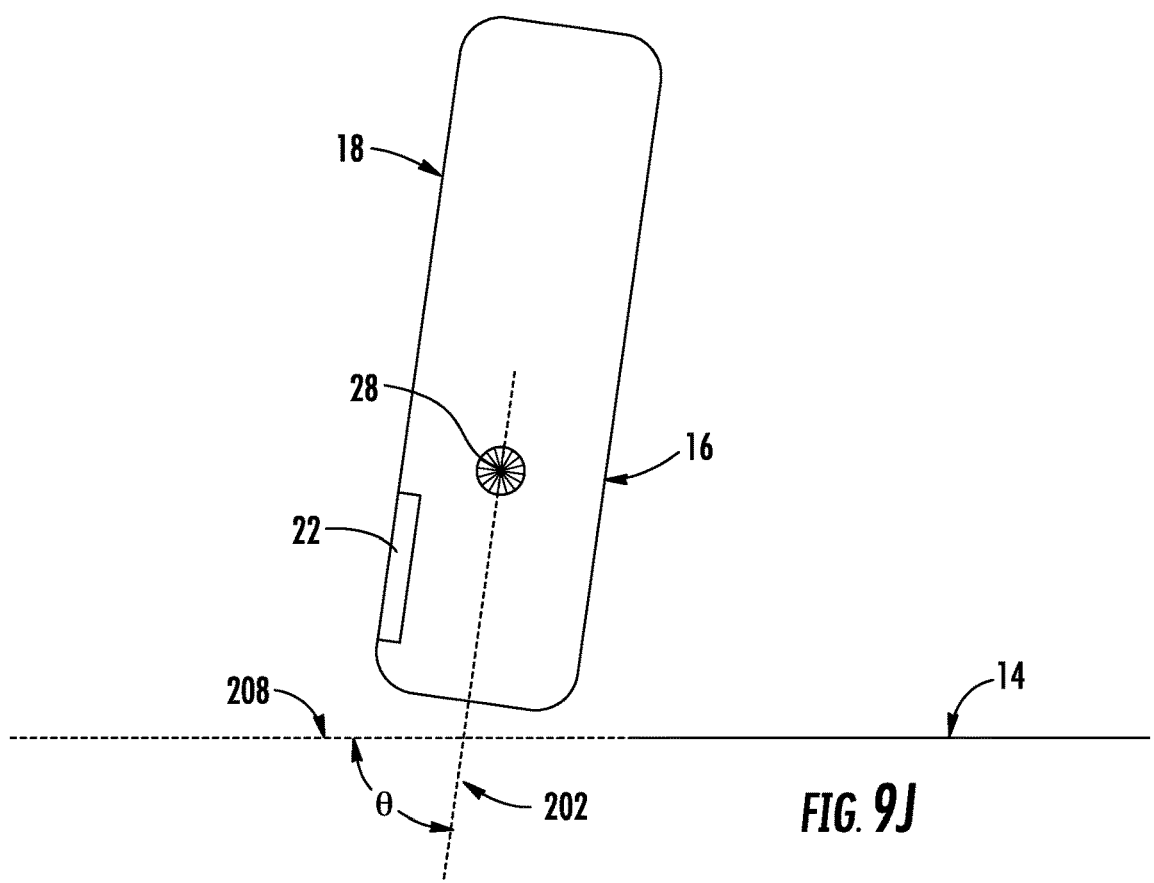
FIG. 9J is a side view representation of a peripheral device above a surface being tilted longitudinally to angle θ.

Referring to FIGS. 9G-9J, a peripheral device 100 is rotated to some negative longitudinal tilt angle θ, the longitudinal tilt angle θ decreasing as the peripheral device 100 moves continuously between the positions shown in FIG. 9G, FIG. 9H, FIG. 9I, and then FIG. 9J. Decreasing of the longitudinal tilt angle θ shall be referred to as "forwards tilting." The positions shown in FIGS. 9G-9J may be reached in a number of ways, including by grasping the peripheral device 100 by a point other than the grip points 28 and tilting the peripheral device 100, by grasping the peripheral device 100 by grip points 28 that are not rotatable and tilting the peripheral device 100, or by grasping the peripheral device 100 by grip points 28 that are rotatable where the center of gravity (not shown) of the peripheral device 100 is located between the grip point rotation axes 38 and the front surface 30. In order to facilitate this backwards tilting, the peripheral device 100 may include additional sets of grip points (not shown) located such that the center of gravity (not shown) is located between a first set of grip points 28 and a second set of grip points (not shown). A peripheral device 100 may have many sets of grip points 28.

In one embodiment, there may be one set of grip points 28 per tilt axis (e.g. one set of grip points 28 for both forwards and backwards tilting). In another embodiment, there may be one set of grip points 28 per tilt direction (e.g. one set of grip points 28 for forwards tilting and one set of grip points 28 for backwards tilting). In yet another embodiment, there may be multiple grip points 28 per tilt axis.

Figure 10A:
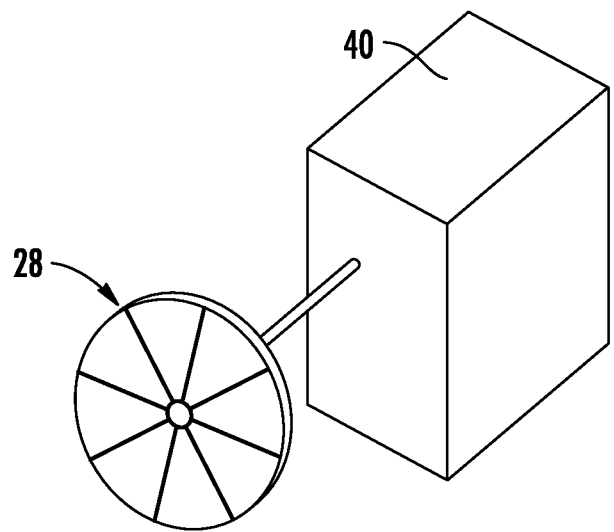
FIG. 10A is a representation of a grip point attached to a rotation sensor.
Figure 10B:
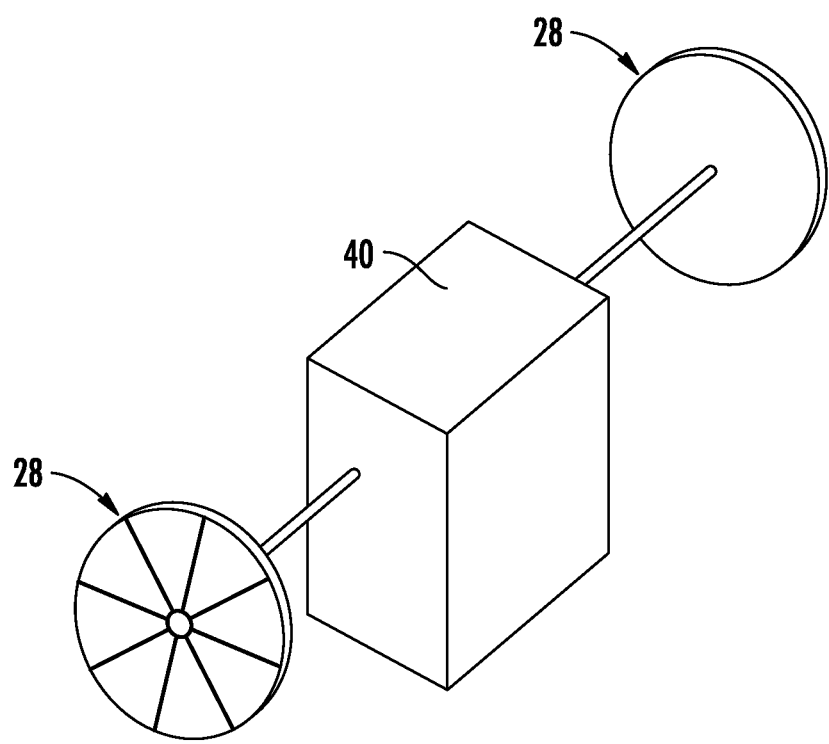
FIG. 10B is a representation of a set of grip points attached to a single rotation sensor.

In some embodiments, the tilt sensor 104 of FIGS. 1-4 is embodied in the grip points 28. Referring to FIGS. 10A and 10B, the grip points 28 are rotatable and at least one rotation sensor 40 measures the rotation of the grip points 28 with respect to the peripheral longitudinal axis 202. Therefore, when a user lifts the peripheral device 100 while grasping only a set of grip points 28, the grip points 28 will rotate with respect to the peripheral longitudinal axis 202, and that rotation will be measured by the rotation sensor 40 and will represent the longitudinal tilt angle θ. The rotation sensor 40 that measures such rotation may be any suitable sensor, such as a reflector sensor, an interrupter sensor, an optical encoder sensor, a variable-reluctance sensor (VR sensor), a hall-effect sensor, or any other sensor capable of measuring the rotation of the grip points 28. The peripheral device 100 may contain a rotation sensor 40 for each grip point 28 as depicted in FIG. 10A, or a set of grip points 28 may share a single rotation sensor 40 as depicted in FIG. 10B. When a set of grip points 28 share a single rotation sensor 40, the grip points 28 may also share a single grip point rotation axis 38.

In some embodiments (not shown), the peripheral device 100 may be equipped with multiple sets of grip points 28. In such embodiments, the peripheral device 100 may be capable of distinguishing between which set of grip points 28 a user is holding while the peripheral device 100 is being lifted.

In some embodiments, the rotation sensor 40 may be additionally equipped with pressure sensing functionality so that the rotation sensor 40 is capable of detecting force imparted on a grip point 28 along the grip point rotation axes 38. In such embodiments, the grip points 28 may act as buttons. Each grip point 28 may individually act as a separate button, or the two grip points 28 may act together as a single button.

Figure 11A:
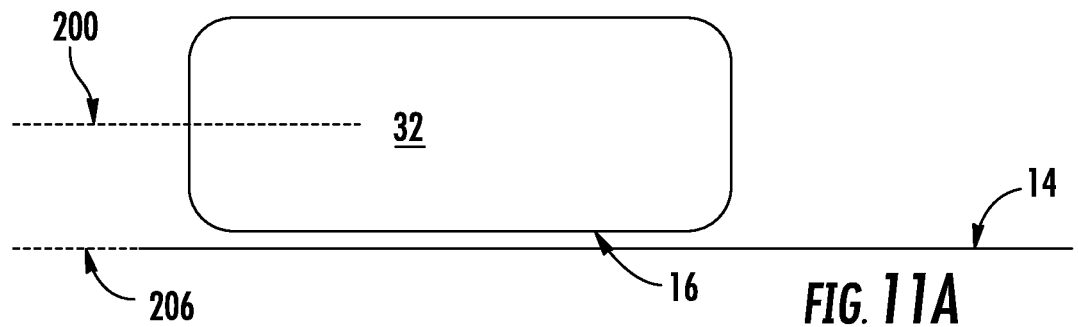
FIG. 11A is a rear view representation of a peripheral device above a surface.

Referring to FIG. 11A, a peripheral device 100 is shown at rest on a support surface 14. The tare lateral axis 206 is a line located within the plane formed by the support surface 14 and parallel to the peripheral lateral axis 200.

Referring to FIGS. 11B-11G, the peripheral device 100 shown contains at least one tilt sensor 104 capable of detecting tilt along the peripheral lateral axis 200 (i.e. capable of detecting rotation about the peripheral longitudinal axis 202).

Figure 11B:
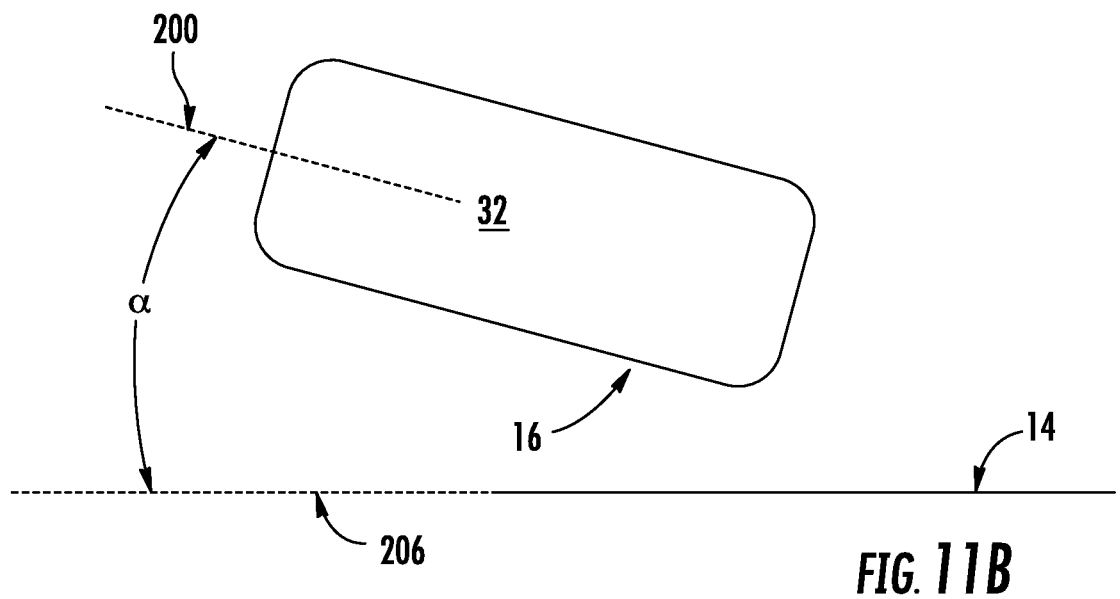
FIG. 11B is a rear view representation of a peripheral device above a surface being tilted laterally to angle α.
Figure 11C:
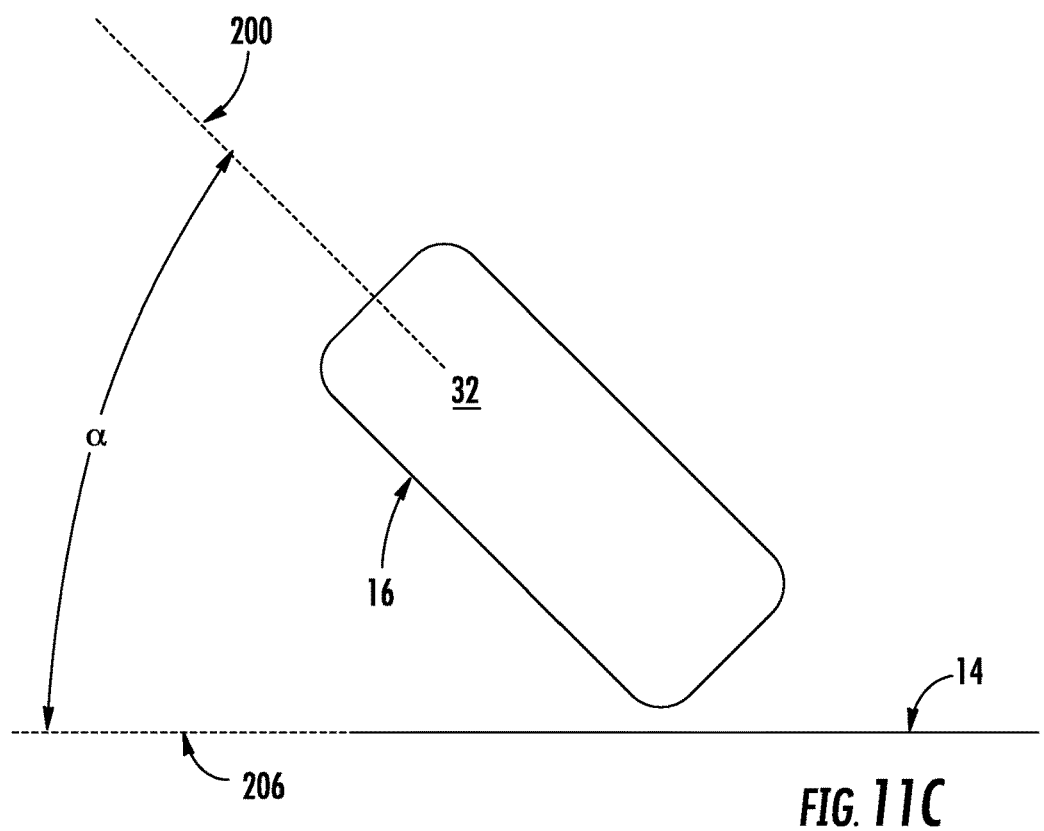
FIG. 11C is a rear view representation of a peripheral device above a surface being tilted laterally to angle α.
Figure 11D:
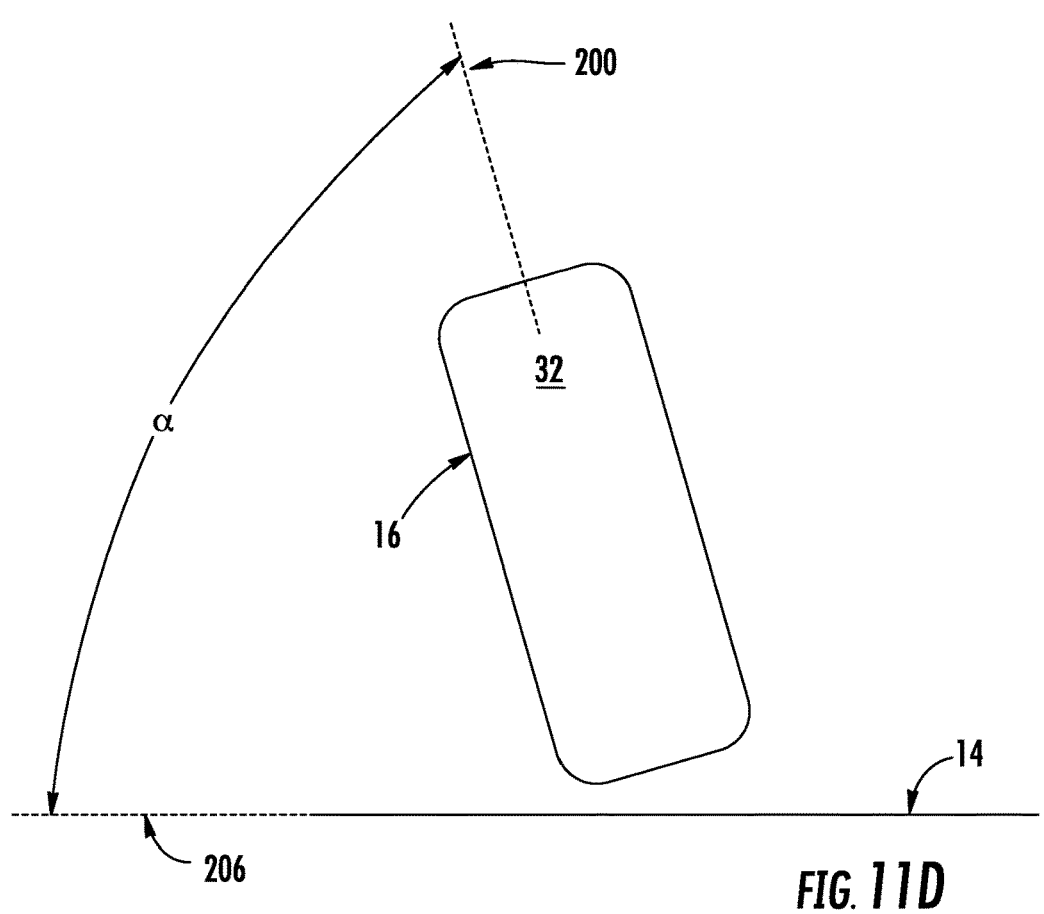
FIG. 11D is a rear view representation of a peripheral device above a surface being tilted laterally to angle α.

Referring to FIGS. 11B-11D, a peripheral device 100 is rotated to some positive lateral tilt angle α, the lateral tilt angle α increasing as the peripheral device 100 moves continuously between the positions shown in FIG. 11B, FIG. 11C, and then FIG. 11D. Increasing of the lateral tilt angle α is referred to herein as "clockwise tilting." The positions shown in FIGS. 11B-11D may be reached in a number of ways, including by grasping the peripheral device 100 and rotating it or by grasping the peripheral device 100 by a set of grip points (not shown) located on the front surface 30 and rear surface 32 in a similar fashion as to how one performs forwards tilting or backwards tilting. It is understood that a user may commonly grip the peripheral device 100 such that a clockwise tilting requires rotation of the user's hand by the wrist or arm, but it is possible for a user to grip the peripheral device 100 in alternate fashions when using the peripheral device 100.

Figure 11E:
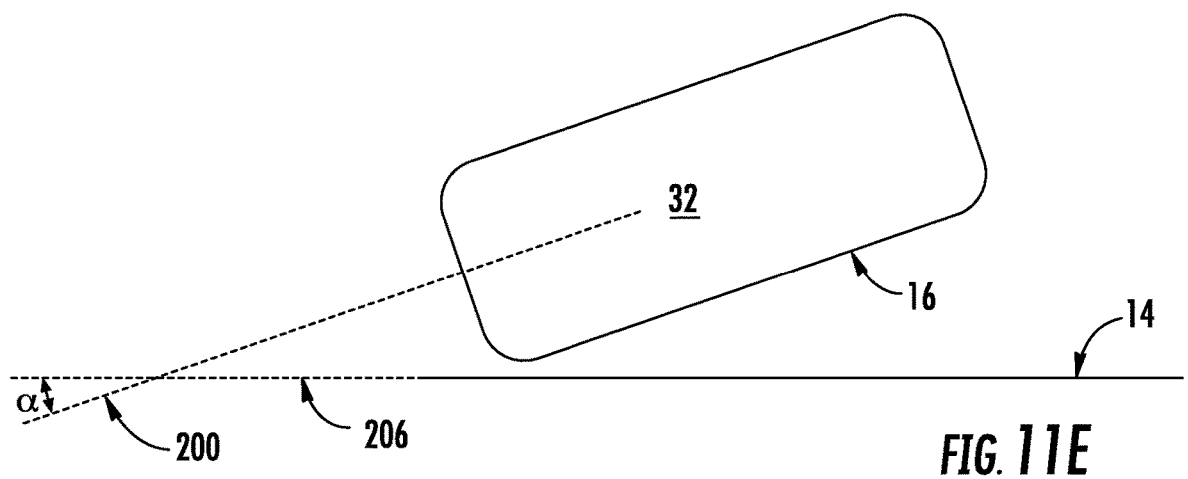
FIG. 11E is a rear view representation of a peripheral device above a surface being tilted laterally to angle α.
Figure 11F:
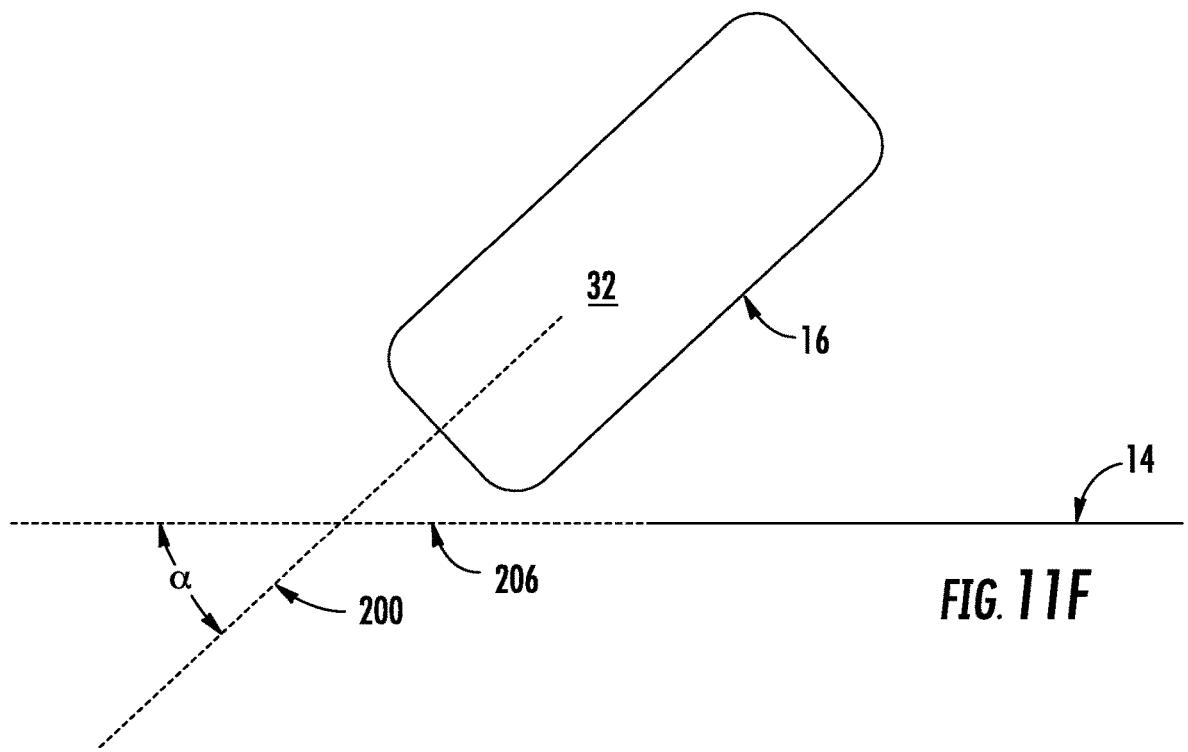
FIG. 11F is a rear view representation of a peripheral device above a surface being tilted laterally to angle α.
Figure 11G:
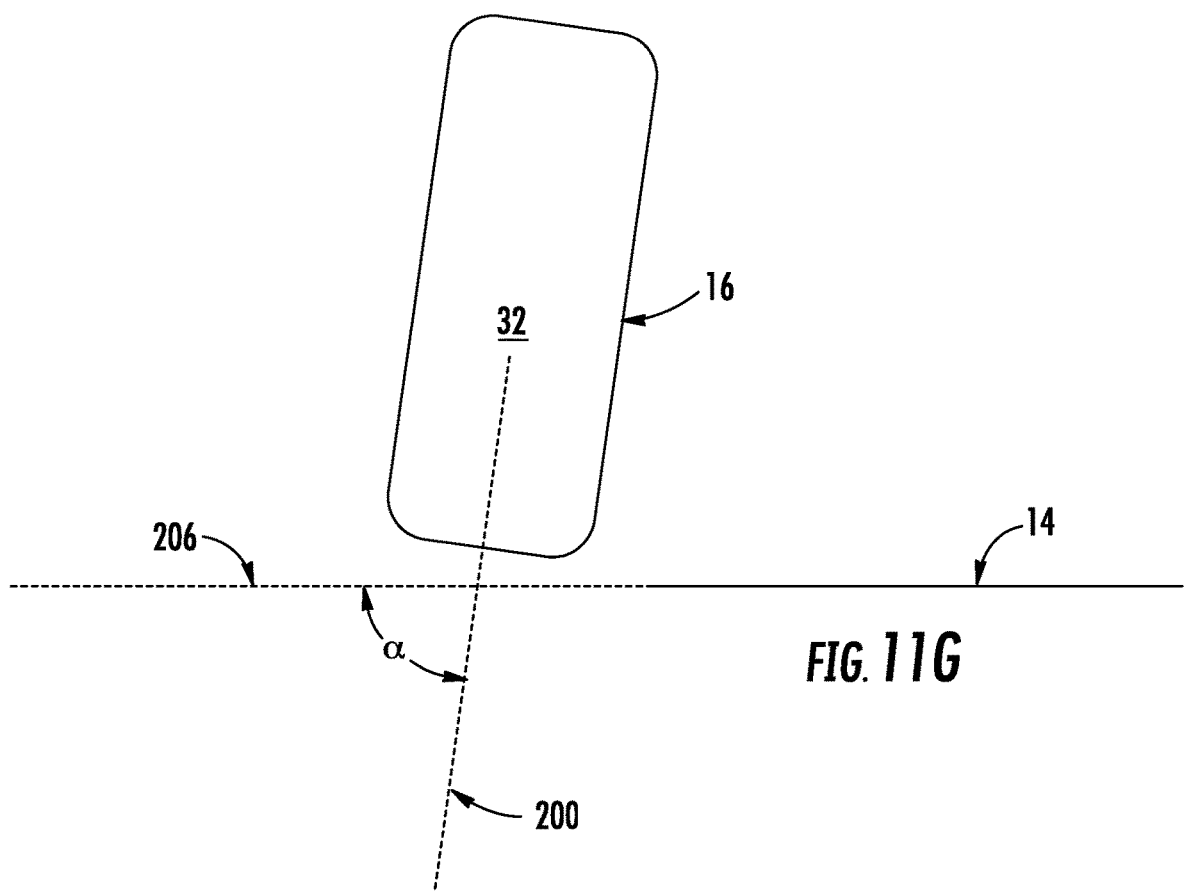
FIG. 11G is a rear view representation of a peripheral device above a surface being tilted laterally to angle α.

Referring to FIGS. 11E-11G, a peripheral device 100 is rotated to some negative lateral tilt angle α, the lateral tilt angle α decreasing as the peripheral device 100 moves continuously between the positions shown in FIG. 11E, FIG. 11F, and then FIG. 11G. Decreasing of the lateral tilt angle α is referred to herein as "anticlockwise tilting." The positions shown in FIGS. 11E-11G may be reached in a number of ways, including by grasping the peripheral device 100 and rotating it or by grasping the peripheral device 100 by a set of grip points (not shown) located on the front surface 30 and rear surface 32 in a similar fashion as to how one performs forwards tilting or backwards tilting. It is understood that a user may commonly grip the peripheral device 100 such that an anticlockwise tilting requires rotation of the user's hand by the wrist or arm, but it is possible for a user to grip the peripheral device 100 in alternate fashions when using the peripheral device 100.

Figure 12A:
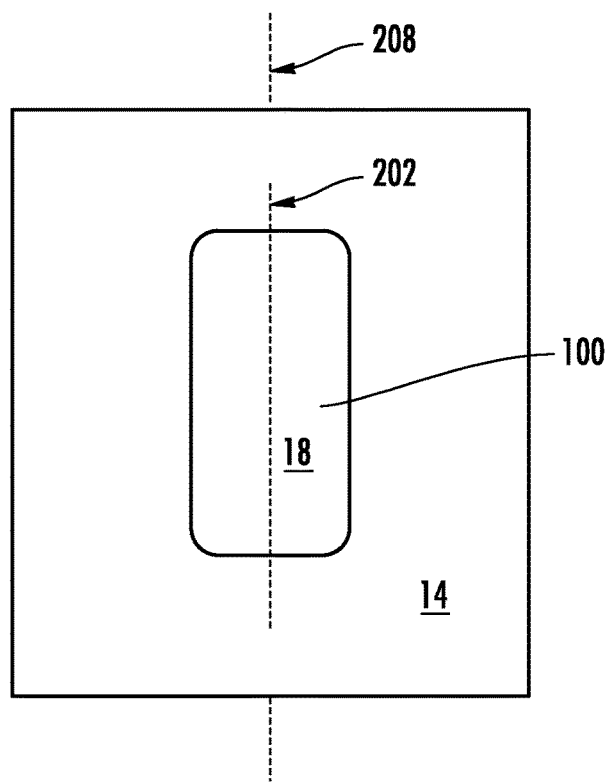
FIG. 12A is a top view representation of a peripheral device above a surface.

Referring to FIG. 12A, a peripheral device 100 is shown at rest on a support surface 14. The tare longitudinal axis 208 is a line located within the plane formed by the support surface 14 and parallel to the peripheral lateral axis 200.

Figure 12B:
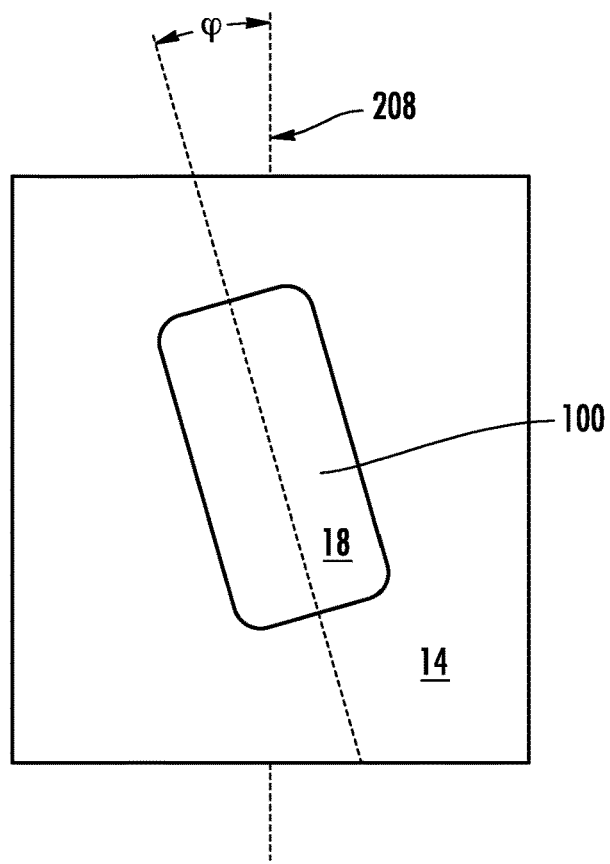
FIG. 12B is a top view representation of a peripheral device above a surface being laterally twisted to angle φ.
Figure 12C:
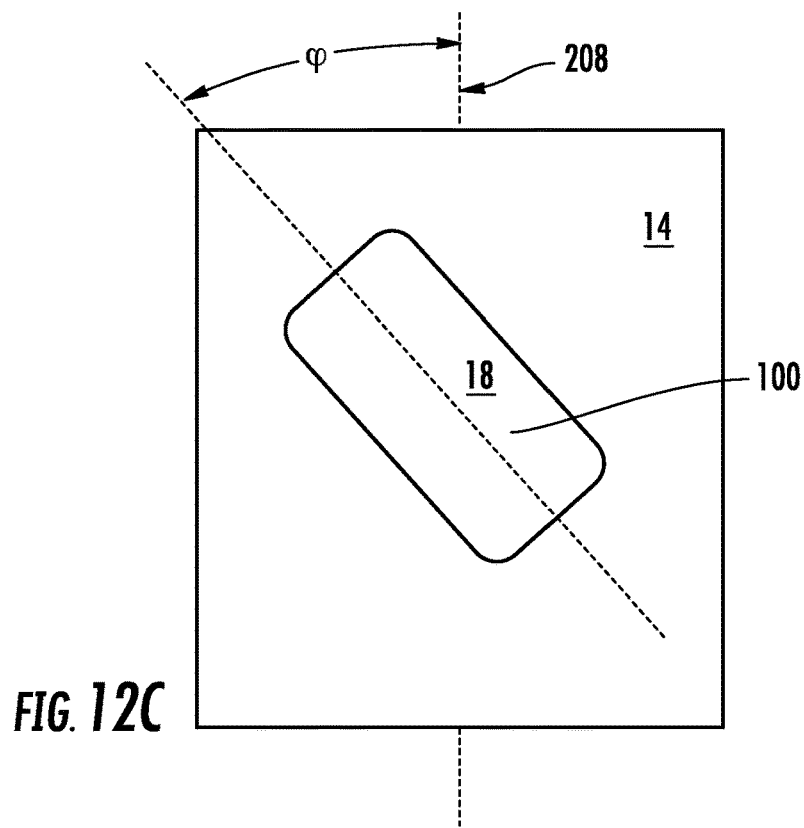
FIG. 12C is a top view representation of a peripheral device above a surface being laterally twisted to angle φ.
Figure 12D:
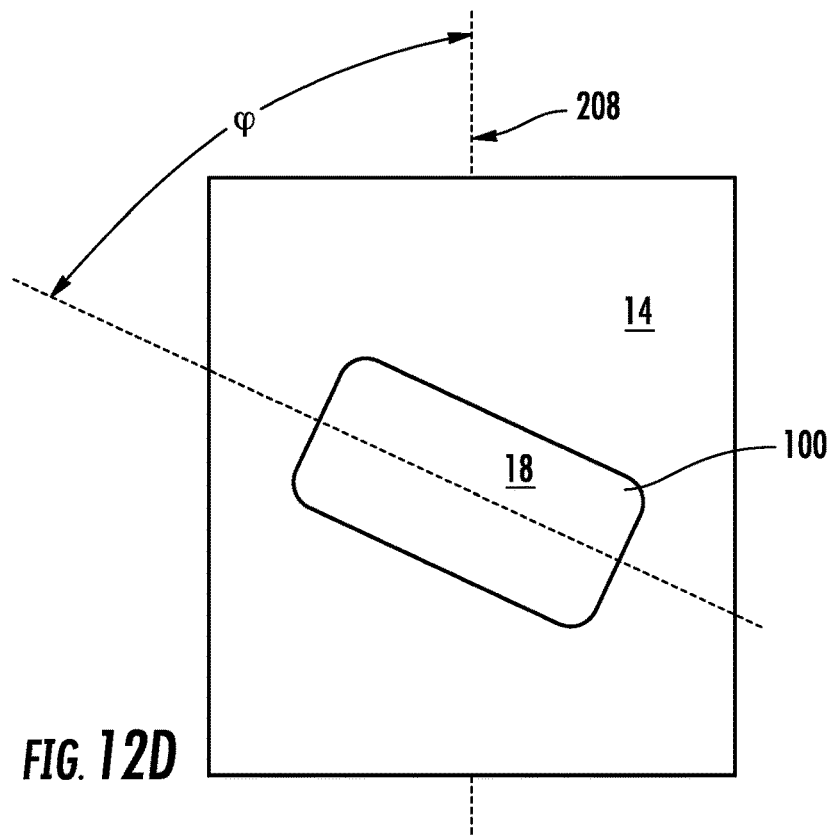
FIG. 12D is a top view representation of a peripheral device above a surface being laterally twisted to angle φ.

Referring to FIGS. 12B-12G, the peripheral device 100 shown contains at least one tilt sensor 104 capable of detecting twist within the plane formed by the peripheral lateral axis 200 and the peripheral longitudinal axis 202 (i.e. capable of detecting rotation about the peripheral vertical axis 204). Referring to FIGS. 12B-12D, a peripheral device 100 is rotated to some positive vertical twist angle φ, the positive vertical twist angle φ increasing as the peripheral device 100 moves continuously between the positions shown in FIG. 12B, FIG. 12C, and then FIG. 12D. Increasing of the vertical twist angle φ is referred to herein as "clockwise twisting." The positions shown in FIGS. 12B-12D may be reached in a number of ways, including by grasping the peripheral device 100 and rotating it.

Figure 12E:
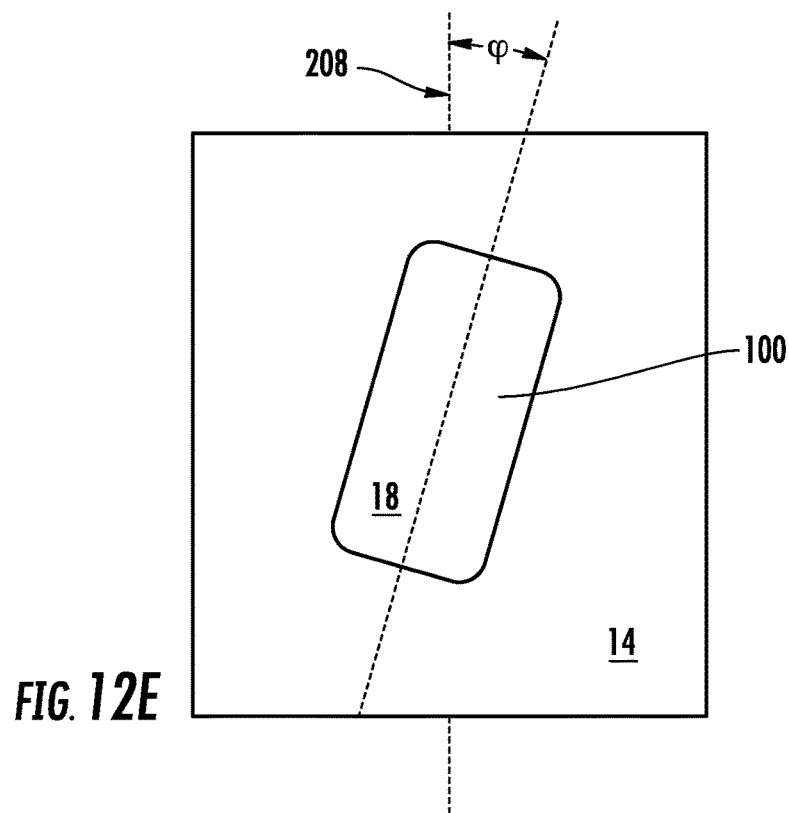
FIG. 12E is a top view representation of a peripheral device above a surface being laterally twisted to angle φ.
Figure 12F:
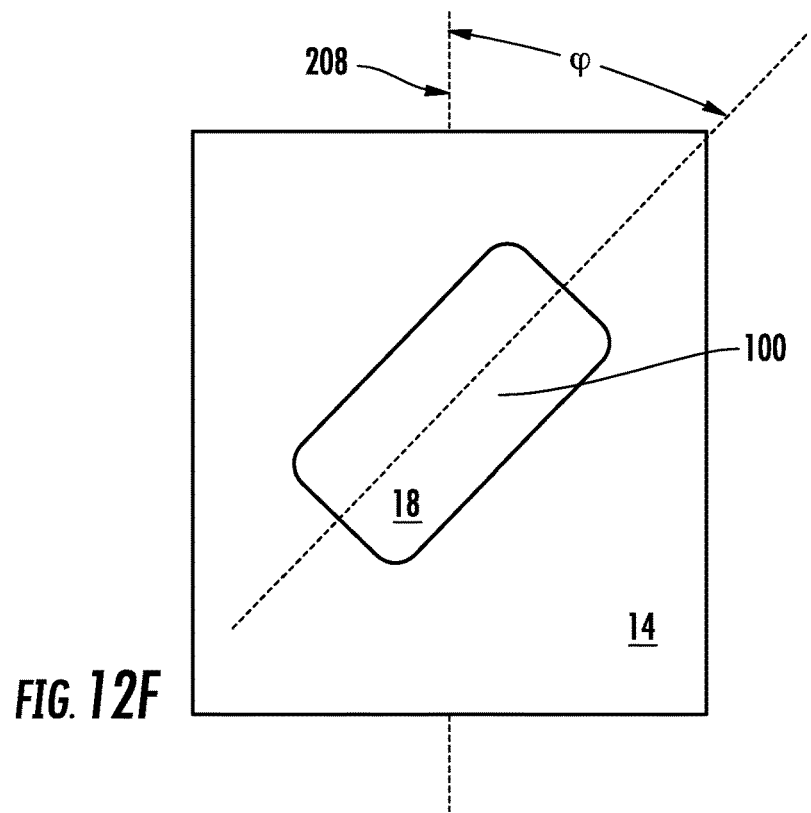
FIG. 12F is a top view representation of a peripheral device above a surface being laterally twisted to angle φ.
Figure 12G:
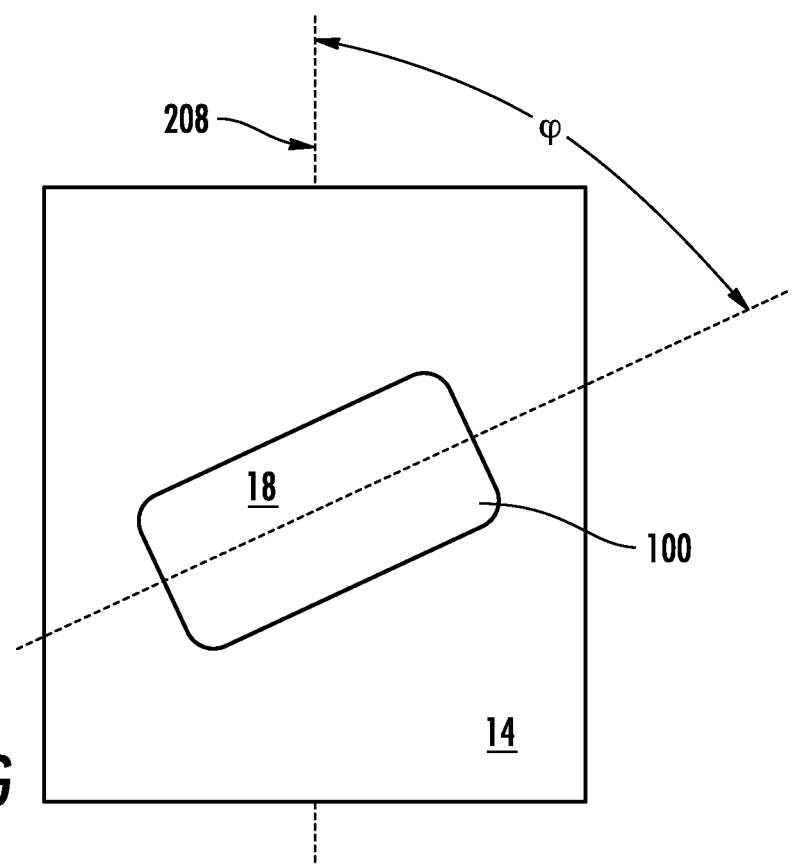
FIG. 12G is a top view representation of a peripheral device above a surface being laterally twisted to angle φ.

Referring to FIGS. 12E-12G, a peripheral device 100 is rotated to some negative vertical twist angle φ, the vertical twist angle φ decreasing as the peripheral device 100 moves continuously between the positions shown in FIG. 12E, FIG. 12F, and then FIG. 12G. Decreasing of the vertical twist angle φ is referred to herein as "anticlockwise twisting." The positions shown in FIGS. 12E-12G may be reached in a number of ways, including by grasping the peripheral device 100 and rotating it.

Secondary Functionality

As used herein, the term "primary functionality" refers to the standard functions of the peripheral device 100. The "primary functionality" would equate to the standard actions that occur when button events or peripheral device 100 movements occur. In the example of a computer mouse, the primary functionality would be standard computer mouse functionality, including at least such functionality as X-Y tracking of the computer cursor, button presses, and scroll wheel movement. Alternate peripheral devices 100 may have different primary functionality. In an embodiment where the peripheral device 100 acts as a remote control, the primary functionality may refer to standard button presses. In an embodiment where the peripheral device 100 acts as a access restricting mechanism such as an electronic lock, the primary functionality may refer to combination inputs or passcode inputs.

As used herein, the term "secondary functionality" refers to the peripheral device 100 functionality when it has been tilted past a threshold value $T_0$. Because a peripheral device 100 can be tilted in a number of tilt directions (i.e. forwards tilt, backwards tilt, clockwise tilt, anticlockwise tilt, clockwise twist, and anticlockwise twist), there may be at least six different secondary functionalities, each based on a different tilt direction. It is understood that when referring to a single secondary functionality, the disclosure thereof may apply to all possible secondary functionalities. Furthermore, it is understood that each secondary functionality may have its own threshold values.

As used herein, the terms "button press" or "button event" both refer to an action or command issued by a user actuating a control on the peripheral device 100. Therefore, the term "button event" may include, but is not limited to, a button press, a key click, a scroll wheel movement, or any other actuation of a control on the peripheral device 100.

In the peripheral device 100 and in prior devices, a button event generally results in an action. In one embodiment of the peripheral device 100, each action may be comprised of one or more sub-actions. Referring to FIG. 7, the peripheral device 100 is a computer mouse 10 having a first button 22, a scroll actuator 24, and a second button 26. Under its primary functionality, pressing the first button 22 will be a button event that causes an action to be performed. When in the primary functionality for each tilt direction, the button event's action is referred to as a primary action. In a standard computer mouse, pressing the first button 22 would generally result in the primary action of a "left click" in the connected computer's operating system. In a standard computer mouse, manipulating the scroll actuator 24 would result in primary action of either a "scroll up," "scroll down," "middle click," or sometimes "scroll left," or "scroll right" signal in the connected computer's operating system.

As used herein, the term "tilt" may refer to lateral tilt, longitudinal tilt, or lateral twist, or any combination thereof. Furthermore, as used herein, the detected tilt angle D° may be used to refer to the detected lateral tilt angle α, the detected longitudinal tilt angle θ, or the detected lateral twist angle φ. It is understood that when the detected tilt angle D° is detected and analyzed as described herein, these descriptions may apply to each tilt direction (i.e. forwards tilt, backwards tilt, clockwise tilt, anticlockwise tilt, clockwise twist, and anticlockwise twist).

Figure 13:
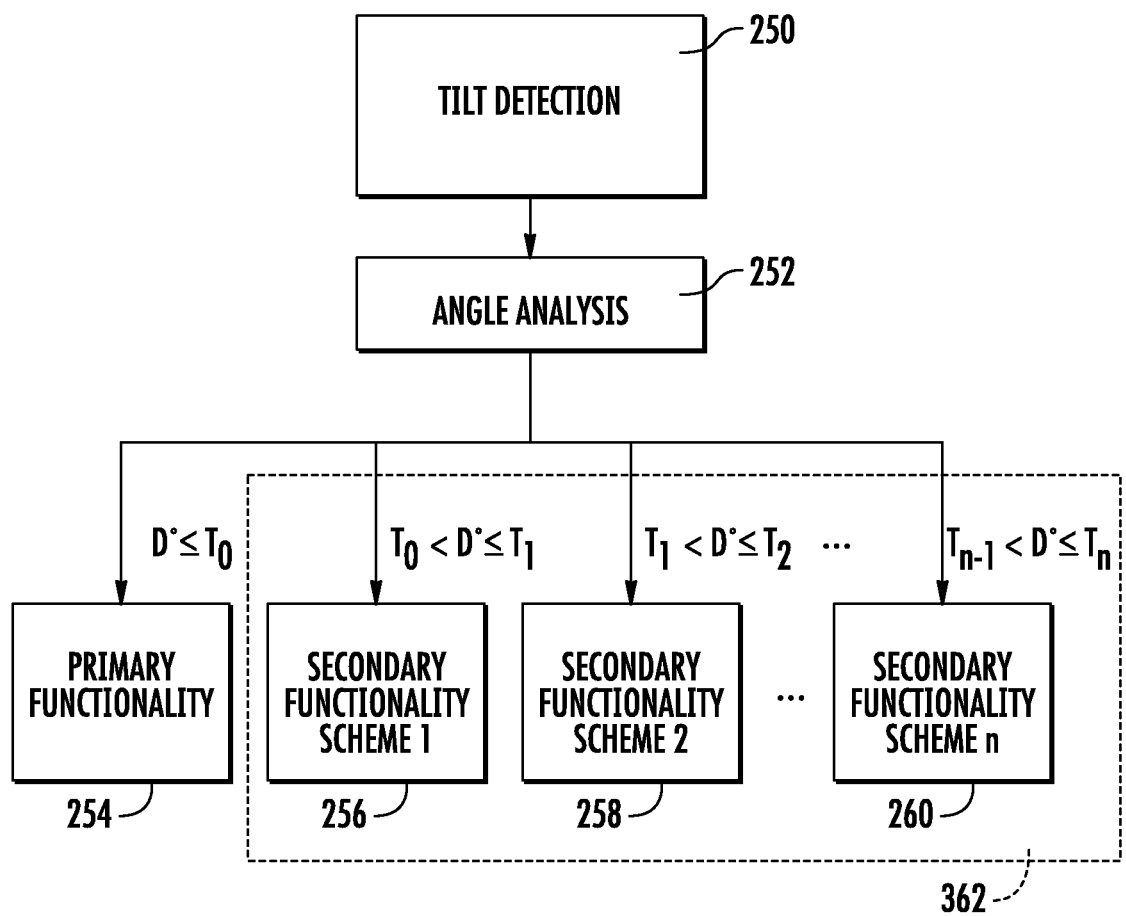
FIG. 13 is a schematic representation of a software interpretation of the controls of a peripheral device.

Referring to FIG. 13, the peripheral device 100 will perform a tilt detection step 250 to determine a detected tilt angle D° for each measured tilt direction. The tilt detection step 250 may be automatically performed at various time intervals or may be triggered when the peripheral device 100 leaves contact with the support surface 14, by a button event, or by another triggering event. After the tilt detection step 250, the detected tilt angle D° is analyzed in an angle analysis step 252. In the angle analysis step 252, the detected tilt angle D° from the tilt detection step 250 will be compared with preset threshold values $T_0, T_1, T_2, \ldots, T_n$. In some embodiments, there will be only one preset threshold value $T_0$, resulting in the presence of only two states: primary functionality 254 and secondary functionality 262. In other embodiments, there will be more than one threshold value, up to n threshold values $T_0 \ldots T_n$, resulting in the presence of n+1 states: primary functionality 254, and up to n secondary functionality schemes 256, 258, 260. Therefore, each threshold value above $T_0$ is associated with a secondary functionality scheme 256, 258, 260. For simplicity's sake, when there is only one threshold value, we will only distinguish between the primary functionality 254 and the secondary functionality 262, even though it is understood that in that case the secondary functionality 262 will be the same as secondary functionality scheme 1 256. As the angle analysis step 252 analyzes the detected tilt angle D°, it will cause the peripheral device 100 to operate in either the primary functionality 254 or in a secondary functionality scheme 256, 258, 260, up to n secondary functionality schemes for up to n threshold values, depending on the detected angle D° and the threshold values $T_1, T_2, \ldots, T_n$.

As used herein, it is understood that the various threshold values $T_1, T_2, \ldots, T_n$ that occur beyond the first threshold value $T_0$ may be referred to as supplemental threshold values.

Therefore, if $D° \leq T_0$, the peripheral device 100 would operate in primary functionality 254; if $T_0 \leq D° \leq T_1$, the peripheral device 100 would operate in secondary functionality 262, specifically in secondary functionality scheme 1 256; if $T_1 < D° \leq T_2$, the peripheral device 100 would operate in secondary functionality 262, specifically in secondary functionality scheme 2 258; up to $T_{n-1} < D° \leq T_n$, where the peripheral device 100 would operate in secondary functionality 262, specifically in secondary functionality scheme n 260. For each secondary functionality scheme 256, 258, 260, button events may produce various secondary actions that differ from the primary actions the same button events would have produced in the primary functionality 254. Furthermore, the functionality (e.g. primary functionality 254 or secondary functionality 262) of one of the other tilt directions may further effect the secondary actions, as well as the threshold values, of this tilt direction.

It is understood that the tilt detection 250 and angle analysis 252 may be performed entirely by the processor 106 within the peripheral device 100, thus allowing the peripheral device 100 to replace a replacement device as a peripheral for a computer 102 or an external device 112. In this fashion, the computer 102 or external device 112 may operate without any knowledge of or programming specific to effecting secondary functionality 262 (e.g. may operate with legacy hardware connections and/or existing software and drivers). As an example, a peripheral device 100 in the form of a computer mouse could contain all necessary programming to effect secondary functionality 262 such that the peripheral device 100 could replace a standard mouse in a computer system without the need to install specific drivers designed for peripheral devices 100 with secondary functionality 262. Such an embodiment may be useful for one-button mice that need to be able to perform both a "left click" and a "right click" action. It is also understood that the tilt detection 250 and angle analysis 252 may be performed entirely by a computer 102, by an external device 112, or by any combination of a computer 102, an external device 112, and the processor 106 within the peripheral device.

Figure 14:
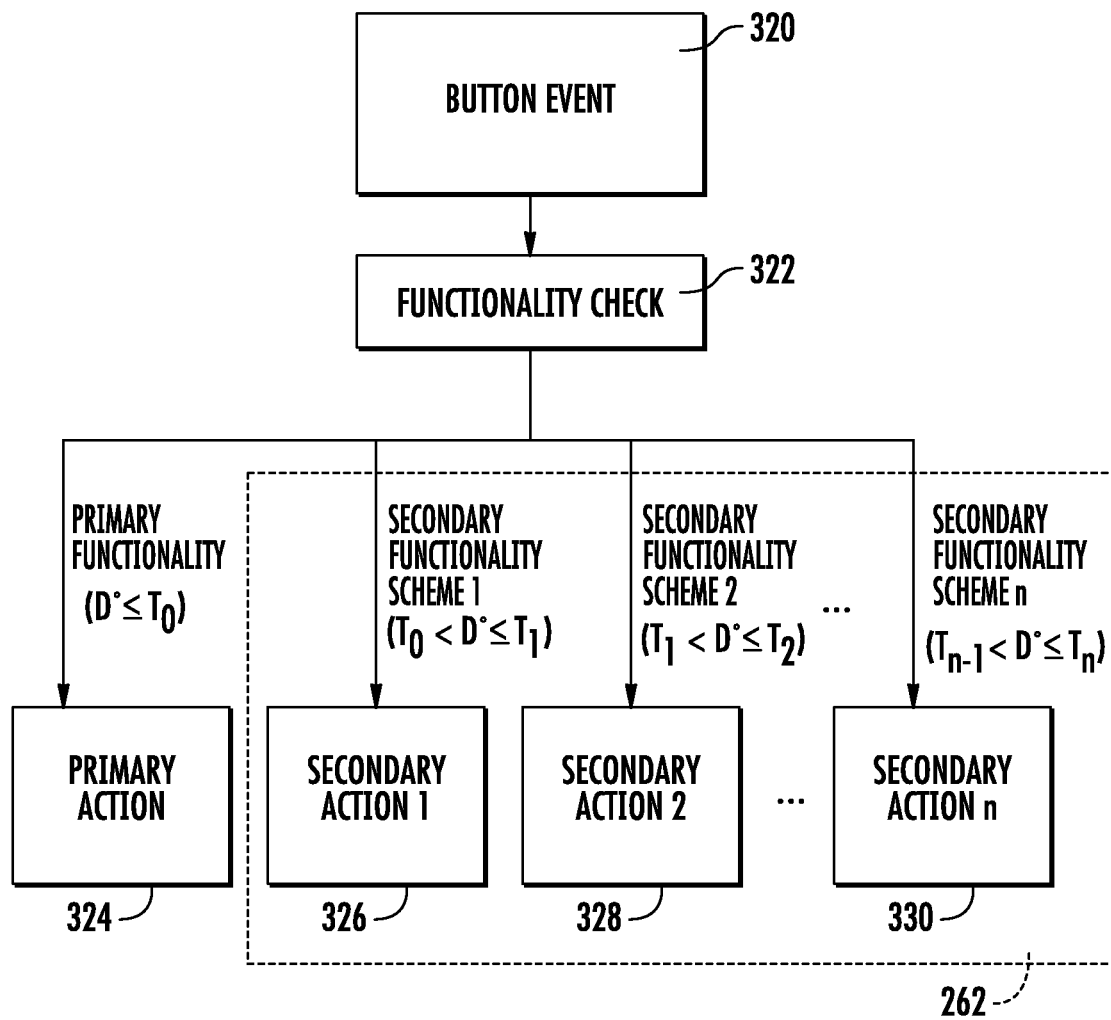
FIG. 14 is a schematic representation of a software interpretation of the controls of a peripheral device.
Figure 15A:
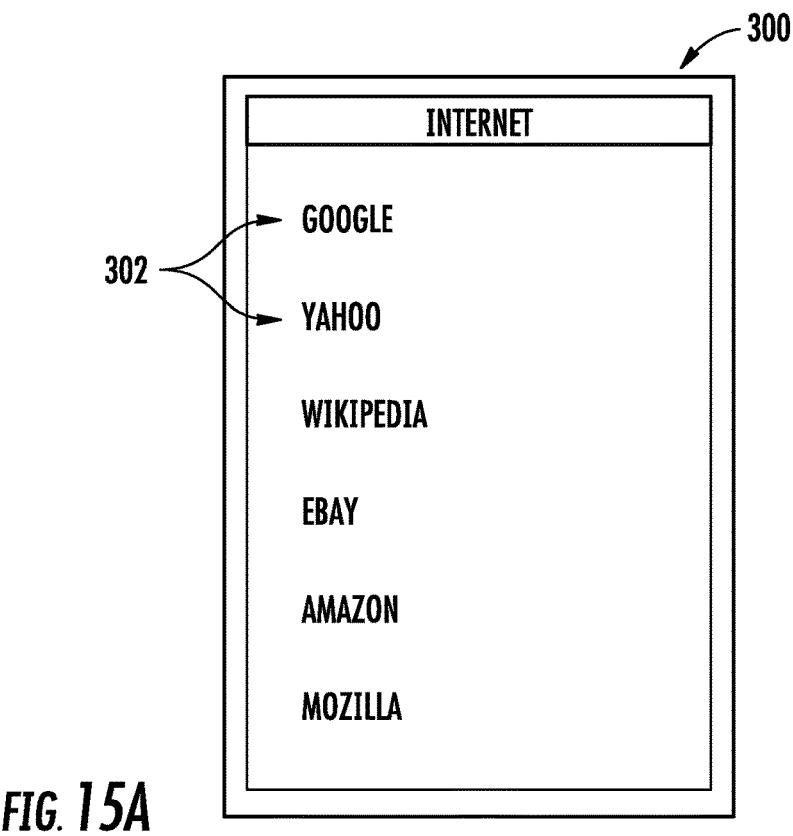
FIG. 15A is a representation of a menu that may be displayed on a display device.
Figure 15B:
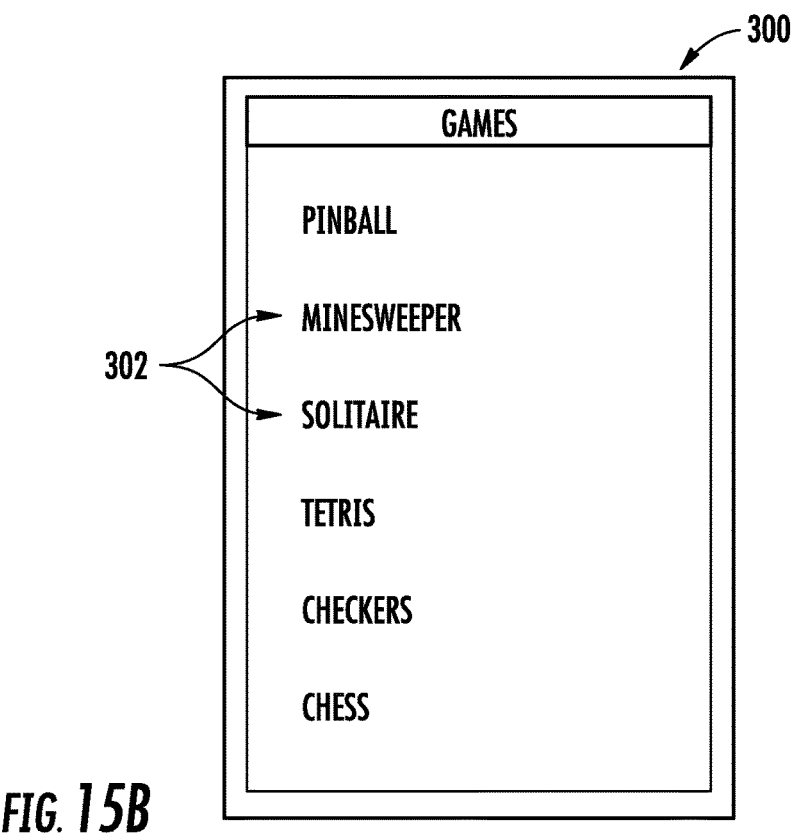
FIG. 15B is a representation of a menu that may be displayed on a display device.
Figure 15C:
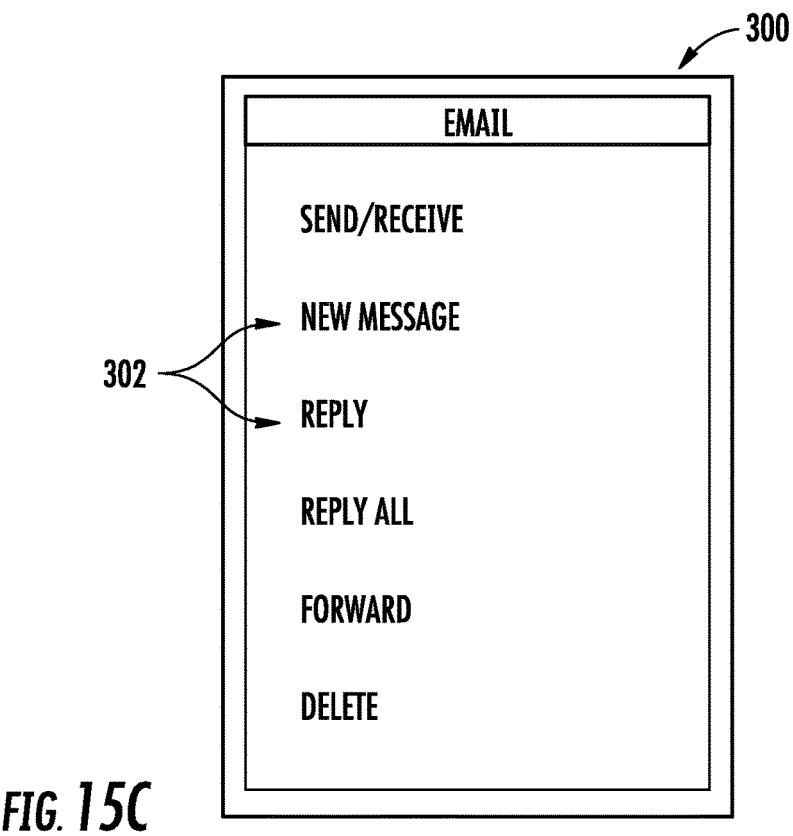
FIG. 15C is a representation of a menu that may be displayed on a display device.
Figure 15D:
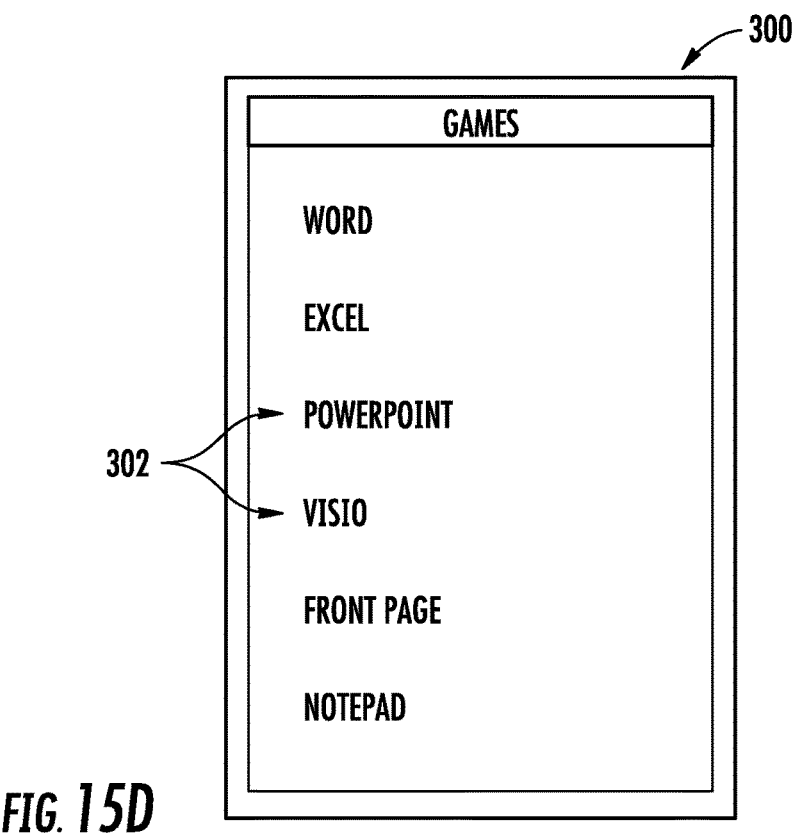
FIG. 15D is a representation of a menu that may be displayed on a display device.
Figure 15E:
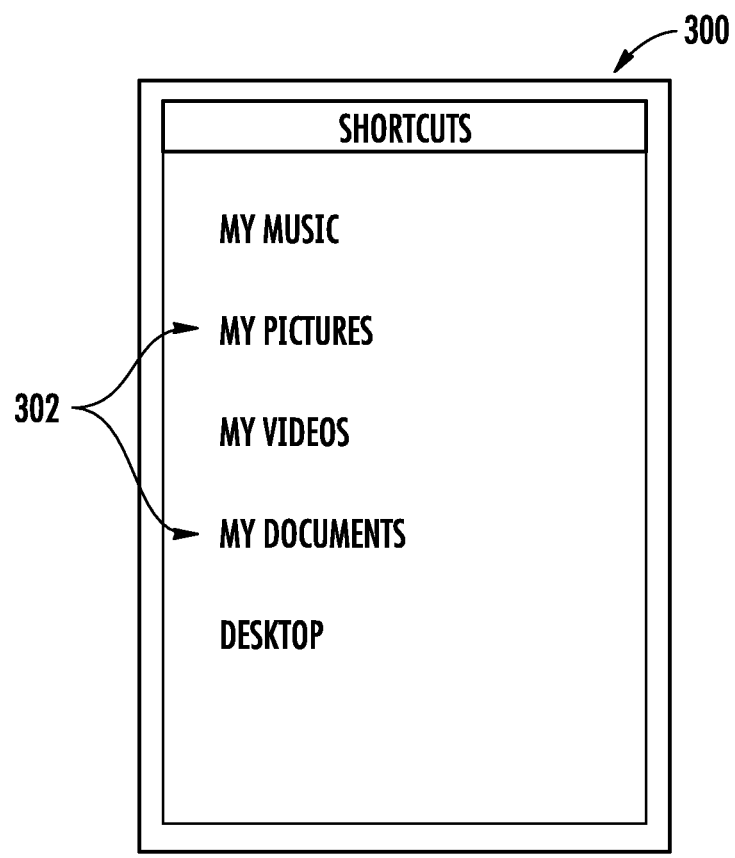
FIG. 15E is a representation of a menu that may be displayed on a display device.
Figure 16A:
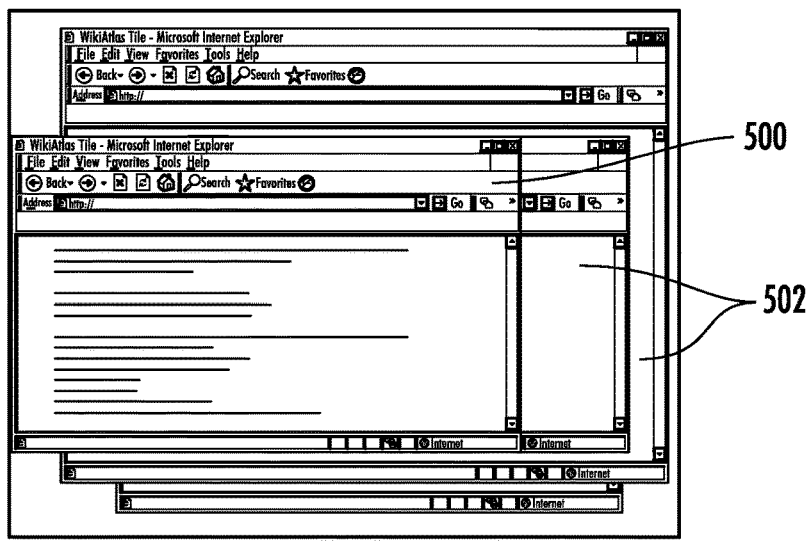
FIG. 16A is a representation of applications or windows that may be displayed on a display device.
Figure 16B:
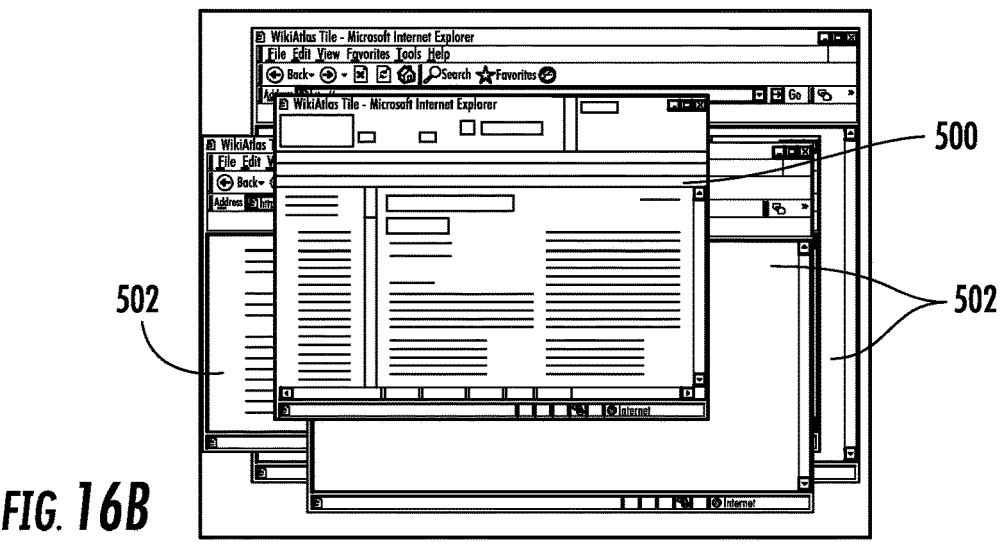
FIG. 16B is a representation of applications or windows that may be displayed on a display device.
Figure 16C:
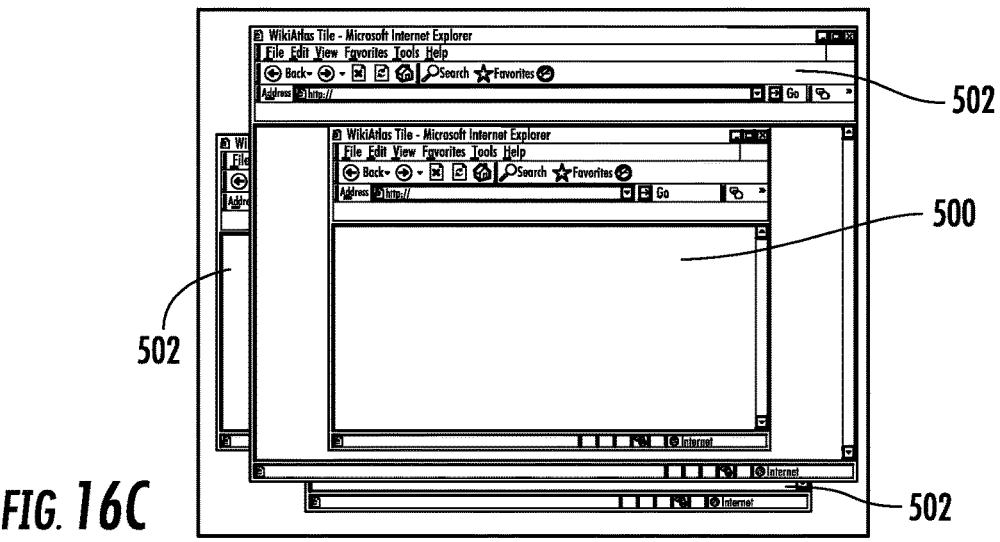
FIG. 16C is a representation of applications or windows that may be displayed on a display device.

Referring to FIGS. 13 and 14, after a button event 320 is detected, a functionality check 322 determines what action is to be taken based on the button event 320 and the current functionality (i.e. tilt) of the peripheral device 100. If the peripheral device 100 is in primary functionality (i.e. $D \leq T_0$) than the button event 320 will lead to a primary action 324 being taken. If the peripheral device 100 is in a secondary functionality 262, the button event 320 will lead to the appropriate secondary action 326, 328, 330 being taken, based on the current secondary functional scheme 256, 258, 260. The number of available secondary actions 326, 328, 330 per tilt axis may be one or more than one, up to n. Therefore, if the peripheral device 100 is in secondary functionality 1 256 (i.e. $T_0 < D° \leq T_1$) than the button event 320 will lead to secondary action 1 326. Likewise, if the peripheral device 100 is in secondary functionality scheme 2 258 (i.e. $T_1 < D° \leq T_2$) than the button event 320 will lead to secondary action 2 328. Finally, if the peripheral device 100 is in secondary functionality scheme n 260 (i.e. $T_{n-1} < D° \leq T_n$) than the button event 320 will lead to secondary action n 330. Secondary button actions 326, 328, 330 for a single button event 320 can be the same as or different from the primary action 324 for that same button event 320.

As an example, referring to FIGS. 7 and 14, if the first button 22 was pressed when the peripheral device 100 is in its primary functionality 254, the button event would lead to a primary action 324, which, in the case of the computer mouse, would commonly be a "left click" in the computer operating system. If the same first button 22 was pressed when the peripheral device 100 was in its secondary functionality 262 (e.g. backwards tilted such that θ is greater than $T_0$), it would perform a secondary action 330, 334, 338 dependant on the secondary functionality scheme 256, 258, 260 of the peripheral device 100. In the case of the computer mouse, a secondary action may be an alternate mouse click, a keyboard input, a combination of key presses, a menu command, an executable script or program, a macro, or any other programmed action. As an example, a secondary action resulting from depressing the first button 22 while the peripheral device 100 is in its secondary functionality 262 may be programmed to be the equivalent of pressing the "CTRL" and "ESC" keys simultaneously on the keyboard, thus causing the Start Menu to appear on Windows® operating systems. In this fashion, a single peripheral device 100 with a limited number of buttons can command many more commands than the number of buttons located on the peripheral device 100.

As another example, a secondary action resulting from depressing a key on a computer keyboard may be programmed to be the equivalent of pressing the "CTRL" button while also pressing the depressed key on the keyboard. In this example, if one were to attempt to use the common "CTRL" and "S" keyboard command to save a document in many popular computer programs, a user of the peripheral device 100 may perform the same command by tilting the peripheral device 100 and pressing the "S" key on the keyboard. It is understood that the peripheral device 100 may be beneficial to those with fewer than ten fingers. In one embodiment, the peripheral device 100 may be worn by a user so that it need not be grasped by a hand.

In an exemplary embodiment, the various secondary functionality schemes of a single tilting or twisting method can affect the threshold values or actions of the secondary functionality schemes of any other tilting or twisting method. For example, when the peripheral device 100 is in forwards tilt secondary functionality scheme 1 and clockwise tilt secondary functionality scheme 1, a button event can have an entirely different action than the same button event while the peripheral device 100 is in forwards tilt secondary functionality scheme 2 and clockwise tilt secondary functionality scheme 1. As such, the number of possible primary and secondary actions for a single button event may equal at least the number of longitudinal tilt secondary functionality schemes plus one multiplied by the number of lateral tilt secondary functionality schemes plus one multiplied by the number of lateral twist secondary functionality schemes plus one.

For example, referring to Table I, a peripheral device 100 can be in a certain functionality for its longitudinal tilt, a certain functionality for its lateral tilt, and a certain functionality for its lateral twist. The various functionalities depend on the position of the peripheral device 100 based on the tare lateral axis 206, tare longitudinal axis 208, and tare vertical axis 210. In the example shown in Table I, the peripheral device 100 has three longitudinal tilt secondary functionality schemes, two lateral tilt secondary functionality schemes, and a single lateral twist secondary functionality scheme. In this example, a single button event on the peripheral device 100 could produce twenty-four different actions, depending on the tilt and twist of the peripheral device 100 when the button event or movement occurs. In addition to or instead of being the result of a button event, any action can be the result of movement into one of the secondary functionality schemes, or can be the result of movement out of a secondary functionality scheme. When actions are the result of movement into or out of a secondary functionality scheme, a required delay may be included so that the action does not take place until the delay time has been reached without any intervening movement into or out of secondary functionality schemes or button events.

configurable through software on a computer 102 or external device 112. Additionally, referring to FIG. 19, the various threshold values $T_0, T_1, T_2, \ldots, T_n$, may be automatically altered or changed when the peripheral device 100 enters a new secondary functionality scheme 256, 258, 260. In this fashion, the various threshold values $T_0, T_1, T_2, \ldots, T_n$, can be dynamically adjusted so that the secondary functionality scheme 256, 258, 260, in which the peripheral device 100 is currently functioning can occupy more of the values between $T_0$ and $T_n$ than the other secondary functionality schemes 256, 258, 260. This functionality results in the user being able to remain in a particular single secondary functionality scheme 256, 258, 260 more easily, as that user would have to further tilt or twist the peripheral device 100 in order to leave that secondary functionality scheme 256, 258, 260.

Figure 19:
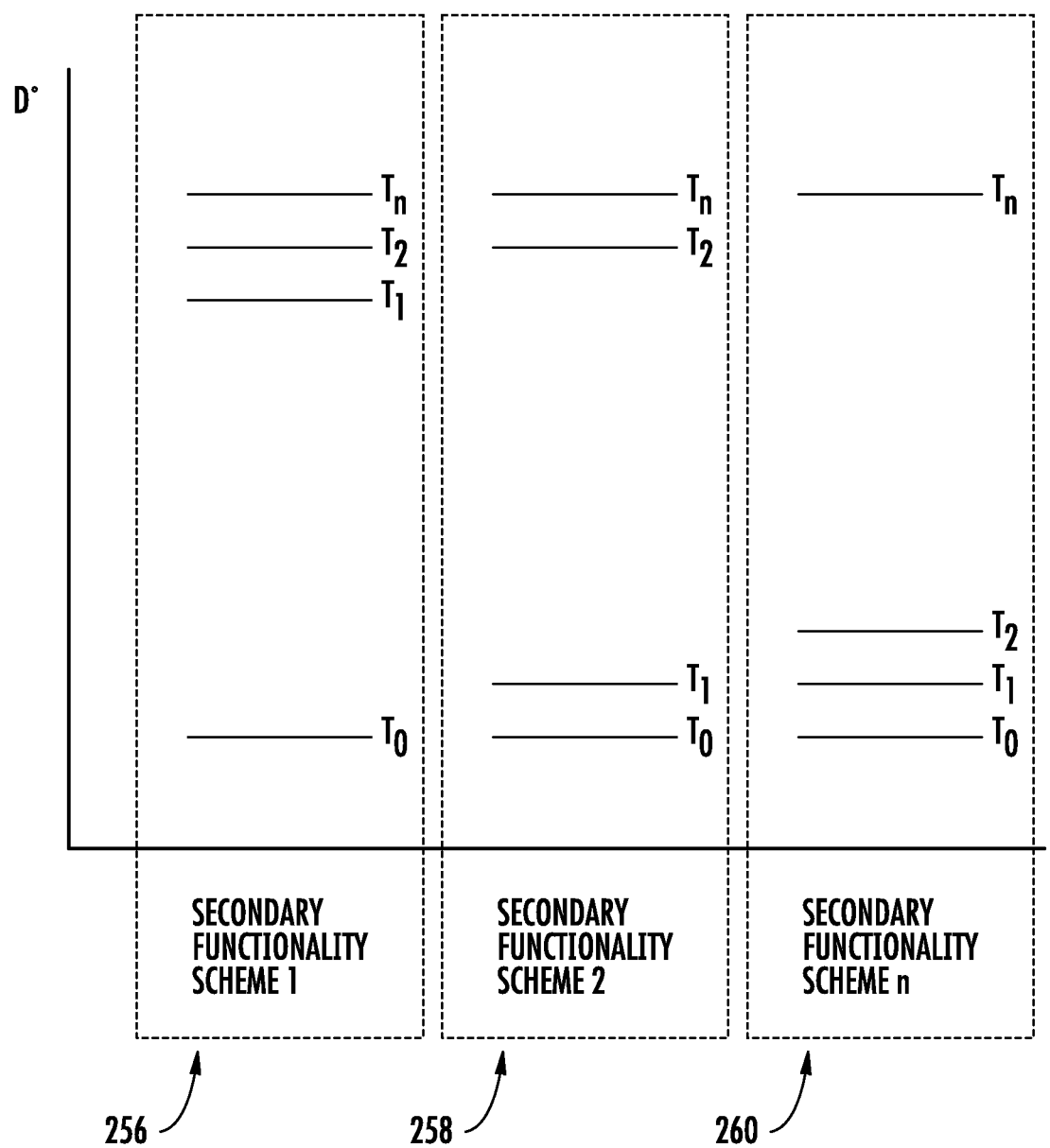
FIG. 19 is a representation of an embodiment where the relative values of the various threshold values change depending on in which secondary functionality scheme the peripheral device is operating.

In an embodiment shown in FIG. 19, the various threshold values $T_1, T_2, \ldots, T_{n-1}$, may change as the peripheral device 100 moves between secondary functionality schemes 256, 258, 260. The left axis in FIG. 19 represents the detected tilt angle D° in any of the tilt directions. It is understood that when positive tilt angles are used (e.g. when performing backwards tilting), the left axis increases from zero to $T_n$, which may be virtually any angle, such as 70°, 90°, 180°, or higher. It is likewise understood that when negative tilt angles are used (e.g. when performing forwards tilting), the left axis decreases from zero to $T_n$, which may be virtually any angle, such as −70°, −90°, −180°, or lower. It is understood that the peripheral device 100 may be tilted so far in one direction (i.e. backwards tilting, forwards tilting, clockwise tilting, anticlockwise tilting, clockwise twisting, or anticlockwise twisting) that it may meet or surpass 180° or even 360°. In fact, such an embodiment would allow a user to tilt the peripheral device 100 through multiple rotations, still reaching additional secondary functionality schemes.

Software Functionality

In addition to being able to perform additional actions for a single button event, the peripheral device 100 is capable of

TABLE I

| Longitudinal Tilt | Lateral Tilt | Lateral Twist | Action |
| --- | --- | --- | --- |
| Primary Functionality | Primary Functionality | Primary Functionality | Action 1 |
| Primary Functionality | Primary Functionality | Secondary Functionality | Action 2 |
| Primary Functionality | Secondary Functionality Scheme 1 | Primary Functionality | Action 3 |
| Primary Functionality | Secondary Functionality Scheme 1 | Secondary Functionality | Action 4 |
| Primary Functionality | Secondary Functionality Scheme 2 | Primary Functionality | Action 5 |
| Primary Functionality | Secondary Functionality Scheme 2 | Secondary Functionality | Action 6 |
| Secondary Functionality Scheme 1 | Primary Functionality | Primary Functionality | Action 7 |
| Secondary Functionality Scheme 1 | Primary Functionality | Secondary Functionality | Action 8 |
| Secondary Functionality Scheme 1 | Secondary Functionality Scheme 1 | Primary Functionality | Action 9 |
| Secondary Functionality Scheme 1 | Secondary Functionality Scheme 1 | Secondary Functionality | Action 10 |
| Secondary Functionality Scheme 1 | Secondary Functionality Scheme 2 | Primary Functionality | Action 11 |
| Secondary Functionality Scheme 1 | Secondary Functionality Scheme 2 | Secondary Functionality | Action 12 |
| Secondary Functionality Scheme 2 | Primary Functionality | Primary Functionality | Action 13 |
| Secondary Functionality Scheme 2 | Primary Functionality | Secondary Functionality | Action 14 |
| Secondary Functionality Scheme 2 | Secondary Functionality Scheme 1 | Primary Functionality | Action 15 |
| Secondary Functionality Scheme 2 | Secondary Functionality Scheme 1 | Secondary Functionality | Action 16 |
| Secondary Functionality Scheme 2 | Secondary Functionality Scheme 2 | Primary Functionality | Action 17 |
| Secondary Functionality Scheme 2 | Secondary Functionality Scheme 2 | Secondary Functionality | Action 18 |
| Secondary Functionality Scheme 3 | Primary Functionality | Primary Functionality | Action 19 |
| Secondary Functionality Scheme 3 | Primary Functionality | Secondary Functionality | Action 20 |
| Secondary Functionality Scheme 3 | Secondary Functionality Scheme 1 | Primary Functionality | Action 21 |
| Secondary Functionality Scheme 3 | Secondary Functionality Scheme 1 | Secondary Functionality | Action 22 |
| Secondary Functionality Scheme 3 | Secondary Functionality Scheme 2 | Primary Functionality | Action 23 |
| Secondary Functionality Scheme 3 | Secondary Functionality Scheme 2 | Secondary Functionality | Action 24 |

The number of and value of the various threshold values $T_0, T_1, T_2, \ldots, T_n$, may be pre-programmed, configurable through hardware such as potentiometers and switches, or advanced software functionality when paired with a computer 102 and the appropriate software. The appropriate software may be pre-installed on the computer 102, installed on the peripheral device 100 and transferable to the computer 102, or installed on a piece of computer readable medium and installable on the computer 102.

As used herein, the term "computer-readable medium" refers to any medium that provides or participates in providing executable instructions to a computer processor. Computer-readable medium may take many forms, including but not limited to non-volatile media (e.g. optical or magnetic disks), volatile media (e.g. dynamic memory), and transmission media (e.g. coaxial cables, copper wire, and fiber optics). Transmission media may also include other electrical, optical, acoustic, or electromagnetic (e.g. radio frequency ("RF") or infrared ("IR")) forms. Some common forms of computer-readable media may include, for example, magnetic medium such as floppy disks, hard disks, or magnetic tape; optical medium such as CD-ROMs, CDRWs, DVDs, or Blu-ray disks; physical medium such as punch cards; memory chips or cartridges such as RAM, PROM, or EPROM; carrier waves; or other mediums from which a computer can interpret instructions.

Referring to FIGS. 13 and 15A-15E, the peripheral device 100 is capable of calling up various menus 300 based on the detected tilt angle D°. In one embodiment, when the peripheral device 100 switches from a primary functionality 254 to a secondary functionality 262 (i.e. when $T_0<D°$), software in the computer 102 causes one or more menus 300 or windows to appear. For example, if the peripheral device 100 moves into secondary functionality scheme 1 256 (i.e. when $T_0<D°\leq T_1$), the menu 300 displayed in FIG. 15A may appear. As the peripheral device 100 moves into secondary functionality scheme 2 258 (i.e. when $T_1<D°\leq T_2$), the menu 300 displayed in FIG. 15B may appear. The menus 300 displayed in FIGS. 15C-15E may appear in additional secondary functionality schemes up to secondary functionality scheme n 260. It is understood that any of the menus 300 depicted in FIGS. 15A-15E and other menus may be displayed for any secondary functionality scheme 256, 258, 260. In one example, the different menus for different secondary functionality schemes 256, 258, 260 may be differentiated by color differences, sounds, tactile feedback, or other methods.

These menus 300 may display menu items 302, indicating (not shown) which actions correspond to certain button or keyboard presses. Each menu item 302 may correspond to a program, macro, folder, file, or other action that may be taken when that menu item 302 is engaged. In one embodiment, the user may select and engage (e.g. run or open) a menu item 302. Menu item 302 selection can be made by pressing corresponding buttons or keys indicated (not shown) near the menu item 302 on the peripheral device 100 or on another device, by lowering the peripheral device 100 to the support surface 14 and moving it so that a computer cursor (not shown) is moved over a menu item 302 (in such an embodiment, the menu 300 would have to remain on the screen for a certain time delay to allow the user to select the menu item 302), by moving the non-tilting portion 103 of a split peripheral device 101 so that the mouse cursor (not shown) is moved over a menu item 302, by manually moving an X-Y Sensor 12 (e.g. a trackball) or other control (e.g. a scroll wheel) that is part of the peripheral device 100 or part of another device, or by increasing or decreasing the tilt of the peripheral device 100 to move a selection indicator 308 over the menu item 302. Engagement of the menu item 302 can be made by pressing a corresponding button or key on the peripheral device 100 or on another device or by tilting or twisting the peripheral device 100 along a different axis. For example, if the backwards tilting was being used to open a menu 300 and select a menu item 302, than clockwise tilting, anticlockwise tilting, clockwise twisting, or anticlockwise twisting could be used to engage the selected menu item 302. In this fashion, a user could open a menu, select a menu item, and open the menu item without pressing any buttons or keys on the peripheral device 100 or on any other device, but instead by simply backwards tilting the peripheral device 100 to the desired point and clockwise tilting it.

It is understood that forwards tilting, backwards tilting, clockwise tilting, anticlockwise tilting, clockwise twisting, and anticlockwise twisting can all result in different menus 300 being called. Additionally, each tilt direction (i.e. forwards tilting, backwards tilting, clockwise tilting, anticlockwise tilting, clockwise twisting, and anticlockwise twisting) may have its own number of secondary functionality schemes 256, 258, 260 and can have its own threshold values used to delineate those secondary functionality schemes 256, 258, 260. It is understood that because each secondary functionality 262 and secondary functionality scheme 256, 258, 260 for each direction of tilt can further change the effects of another tilt direction's secondary functionality 262 and secondary functionality schemes 256, 258, 260, it is understood that the number of different menus 300 that can be called simply by combining longitudinal tilt, lateral tilt, and lateral twist may be equal to up to the number of secondary functionality schemes 256, 258, 260 of each tilt axis (i.e. the sum of both tilt directions along that tilt axis) multiplied together.

Referring to FIGS. 13 and 16A-16C, the peripheral device 100 is capable of switching between active windows or programs 500 and inactive windows or programs 502 based on the detected tilt angle D°. In one embodiment, when referring to "active" and "inactive" windows or programs, it is understood that an active window or program 500 has current focus while all inactive windows or programs 502 do not have current focus. In such an embodiment, only one window or program 502 may have focus at a time. In another embodiment, when referring to "active" and "inactive" windows or programs, it is understood that an active window or program 500 is the front-most window or program, while all inactive windows or programs 502 may be hidden behind the active window or program 500. In such an embodiment, there may be an active window or program 500 on every display device of a computer system. In still another embodiment, when the peripheral device 100 switches from a primary functionality 254 to a secondary functionality 262 (i.e. when $T_0<D°$), software in the computer 102 causes the focus to move from the active window or application to an inactive window or application. For example, if the peripheral device 100 moves into secondary functionality scheme 1 256 (i.e. when $T_0<D°\leq T_1$), the window or application with focus as displayed in FIG. 16A may take focus. As the peripheral device 100 moves into secondary functionality scheme 2 258 (i.e. when $T_1<D°\leq T_2$), the window or application with focus as displayed in FIG. 16B may take focus. In the case of a situation where n equals 3, as the peripheral device 100 moves into secondary functionality scheme n 260 (i.e. when $T_2<D°\leq T_a$), the window or application with focus as displayed in FIG. 16C may take focus. In such application or window-switching embodiments, the number of secondary functionality schemes may equal the number of open windows, the number of open applications, or the number of currently displayed windows or currently displayed applications. In another embodiment, a user may use a button event to keep the currently selected active window or program 500 as the active window or program 500 when the peripheral device 100 is lowered to the support surface 14.

In some embodiments (not shown), the action taken while the peripheral device 100 is in a secondary functionality may be the action of scrolling up or down. For example, if the peripheral device 100 was moved into a backwards tilt secondary functionality, the computer may scroll up the page. In the same example, if the peripheral device 100 was moved into a forwards tilt secondary functionality, the computer may scroll down the page. It is understood that any of the other tilting or twisting methods may be used to achieve the scrolling up or down functionality. Furthermore, it is understood that the action taken for each tilt or twist may be many other actions, such as page up or down, webpage forwards or backwards, button presses, or any other computer command or instruction.

Figure 17A:
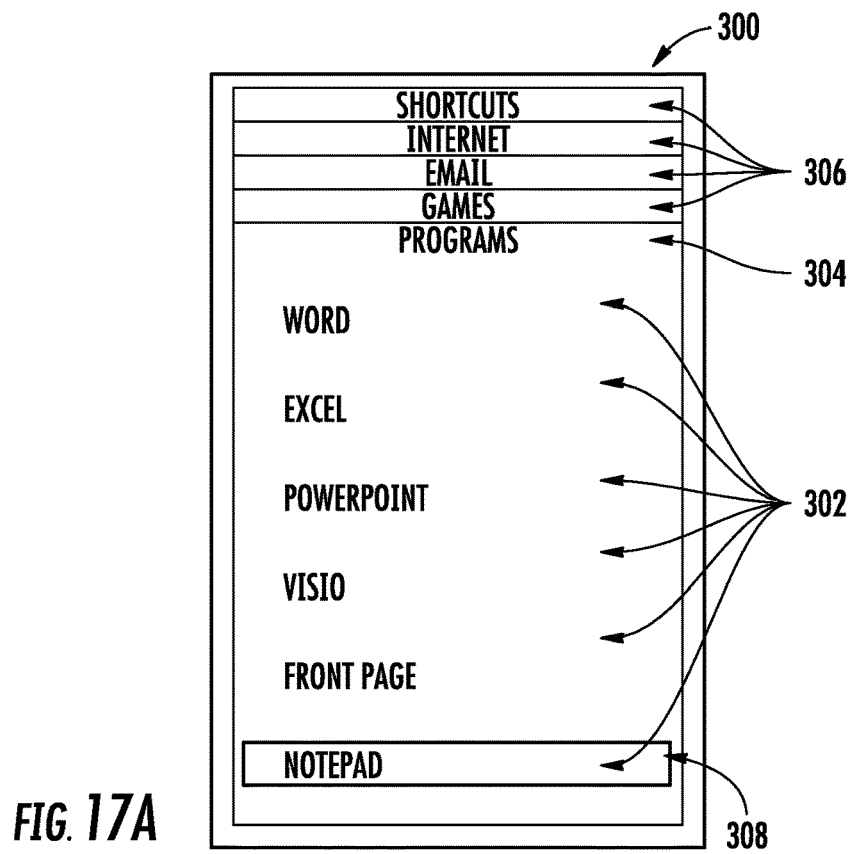
FIG. 17A is a representation of a menu with sub-menus that may be displayed on a display device.
Figure 17B:
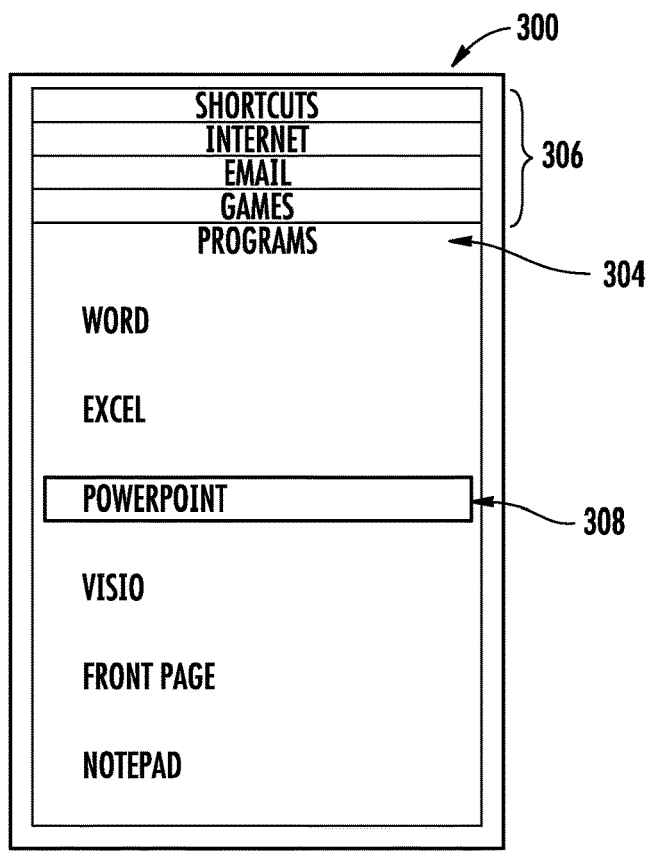
FIG. 17B is a representation of a menu with sub-menus that may be displayed on a display device.
Figure 17C:
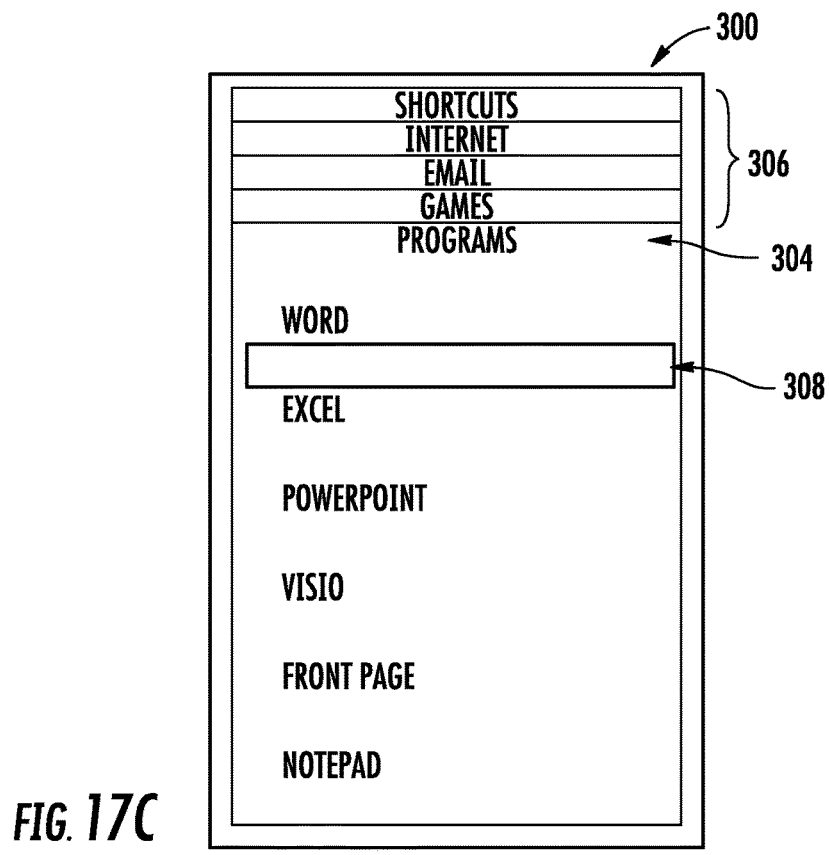
FIG. 17C is a representation of a menu with sub-menus that may be displayed on a display device.

Referring to FIGS. 13 and 17A-17I, the peripheral device 100 is capable of calling up various menus based on the detected tilt angle D°. In one embodiment, when the peripheral device 100 switches from a primary functionality 254 to a secondary functionality scheme 256, 258, 260 (i.e. when $T_0<D°$), software in the computer 102 causes one or more menus or windows to appear. FIG. 17A depicts a typical menu 300 that may appear when a user moves a peripheral device 100 into a secondary functionality scheme 1 256 through backwards tilting. The menu 300 consists of a number of inactive sub-menus 306 and a single active sub-menu 304, although embodiments may have one or more active sub-menus 304 and zero or more inactive sub-menus 306. The inactive sub-menus 306 may be indicated as inactive through the use of colors, textures, other indications, or the lack of menu items (e.g. the menu being minimized so that only the title of the menu is shown). The active sub-menu 304 may contain one or more menu items 302. Referring to FIG. 17A, as the user increases and decreases the longitudinal tilt angle θ, a selection indicator 308 moves up and down the menu to highlight various menu items 302. The progression from FIG. 17A to FIG. 17B to FIG. 17C represents the corresponding movement of the selection indicator 308 as the longitudinal tilt angle θ is increased.

Referring to FIGS. 17A-17I, the selection indicator 308 is configured to move between the bottom of the active sub-menu 304 and the top of the active sub-menu 304 as the detected tilt angle D° moves from just above $T_0$ to $T_1$. If the detected tilt angle D° is moved to $T_0$ or below, the menu 300 and selection indicator 308 will disappear.

Figure 17D:
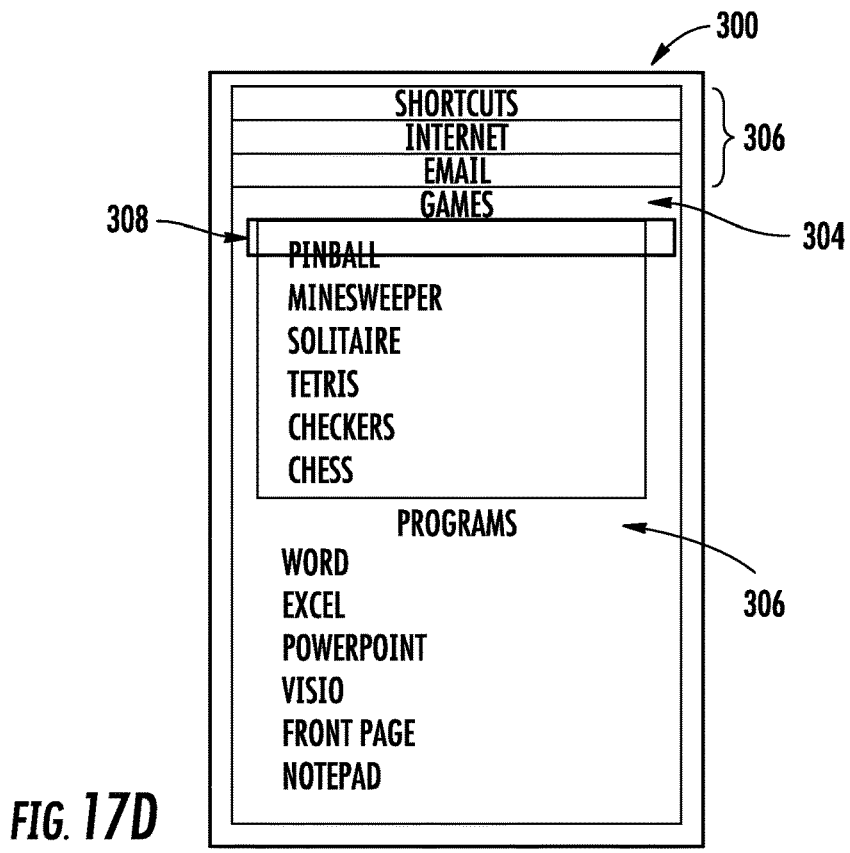
FIG. 17D is a representation of a menu with sub-menus that may be displayed on a display device.
Figure 17E:
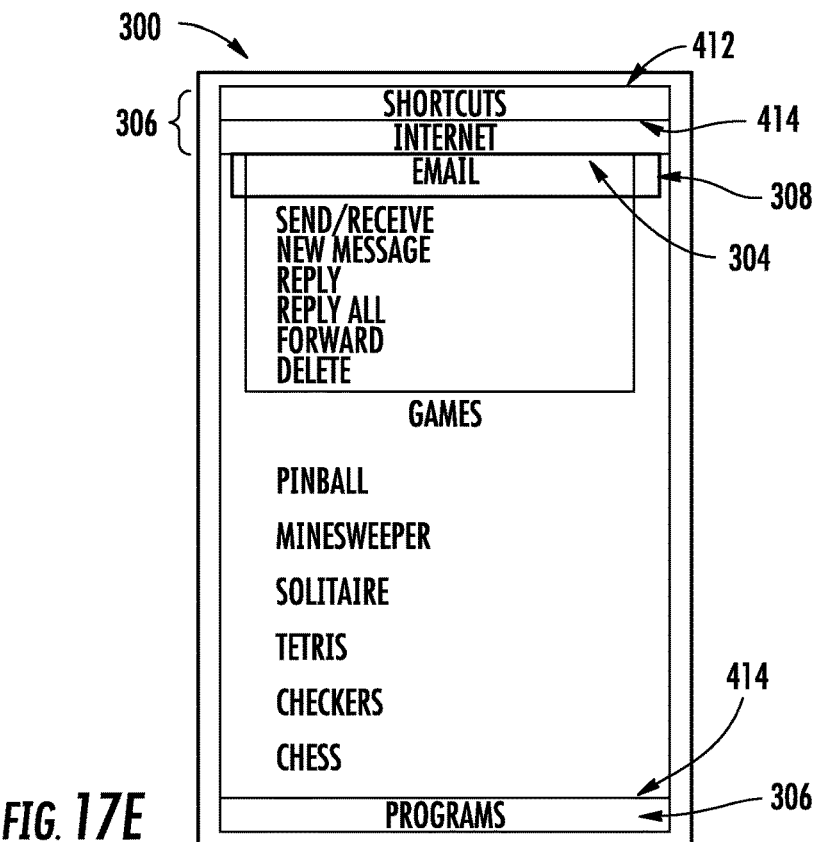
FIG. 17E is a representation of a menu with sub-menus that may be displayed on a display device.
Figure 17F:
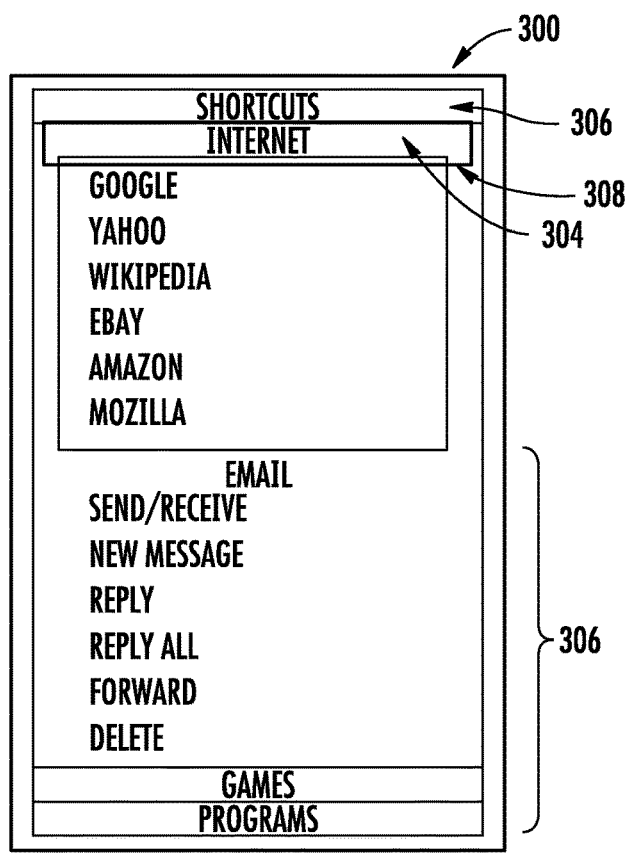
FIG. 17F is a representation of a menu with sub-menus that may be displayed on a display device.
Figure 17G:
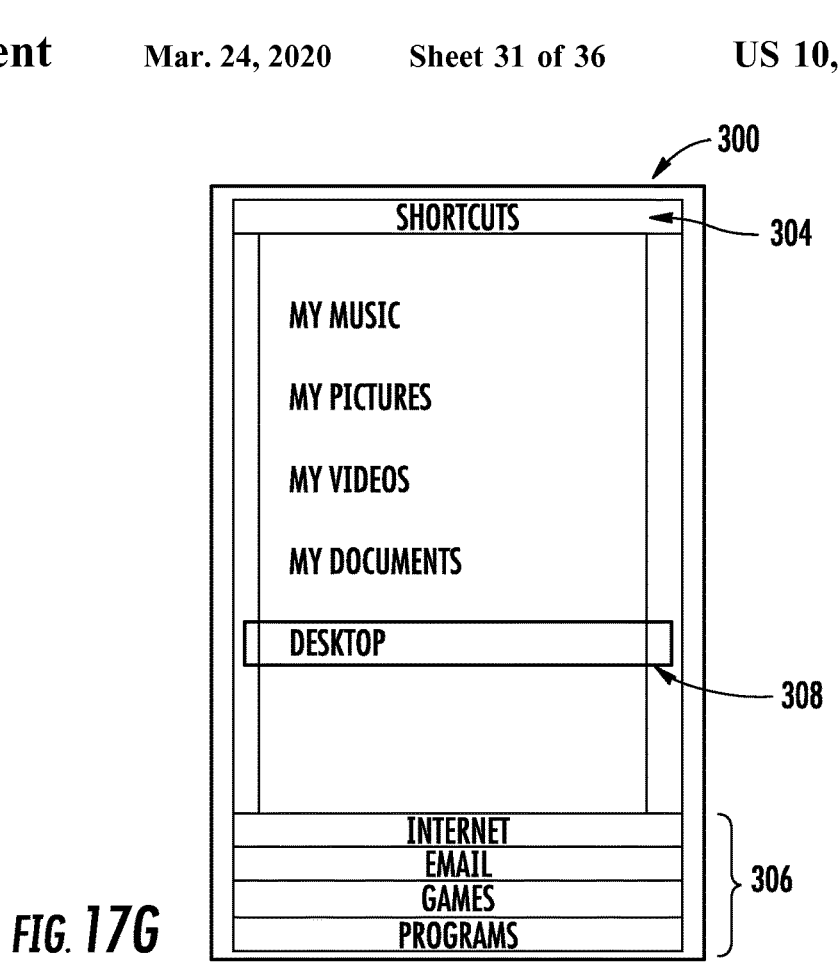
FIG. 17G is a representation of a menu with sub-menus that may be displayed on a display device.
Figure 17H:
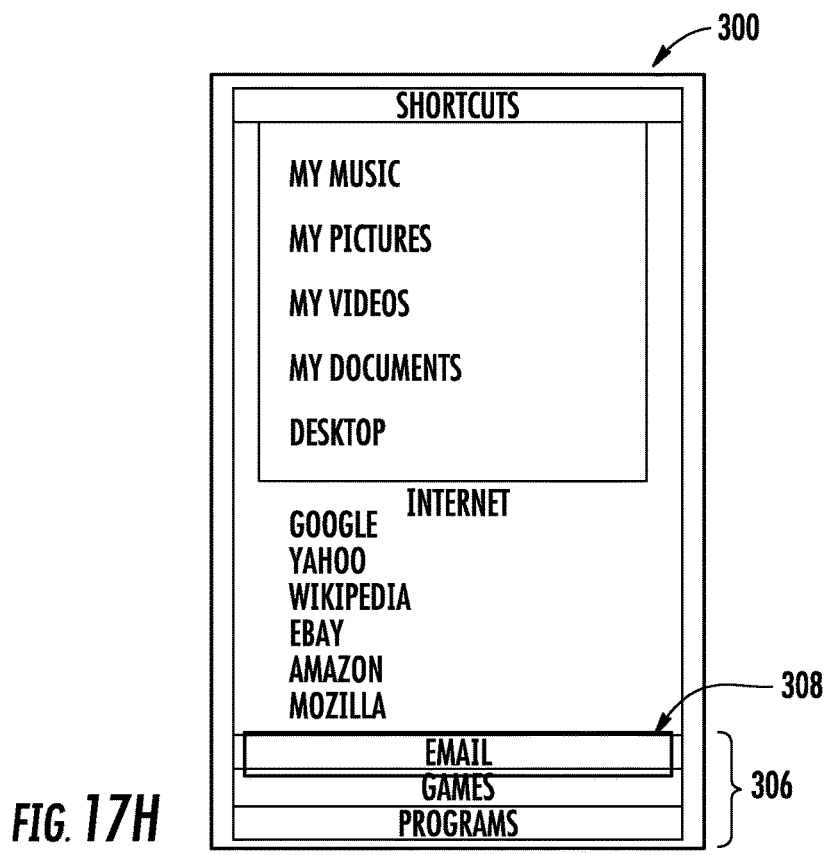
FIG. 17H is a representation of a menu with sub-menus that may be displayed on a display device.
Figure 17I:
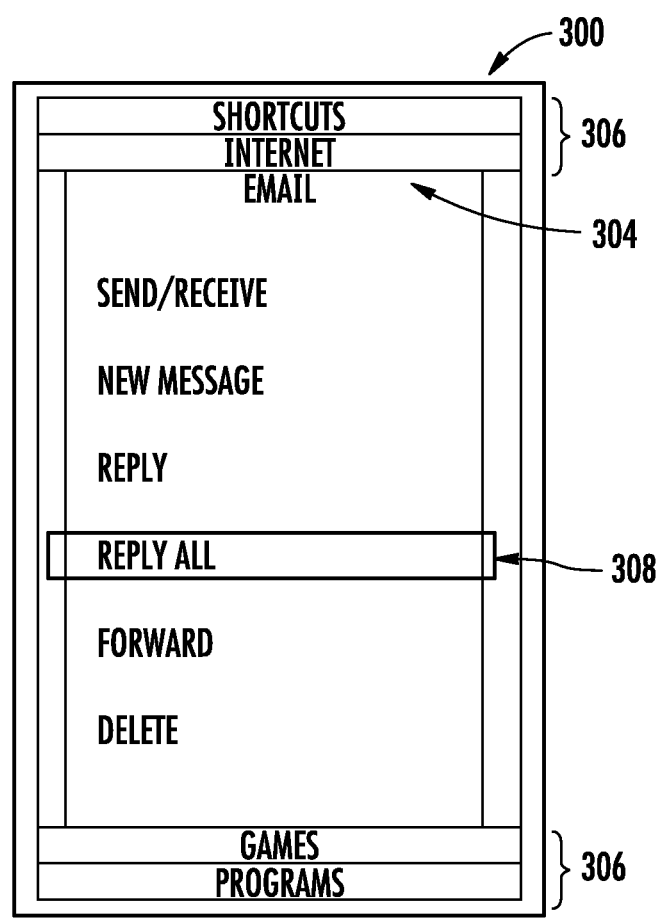
FIG. 17I is a representation of a menu with sub-menus that may be displayed on a display device.
Figure 18A:
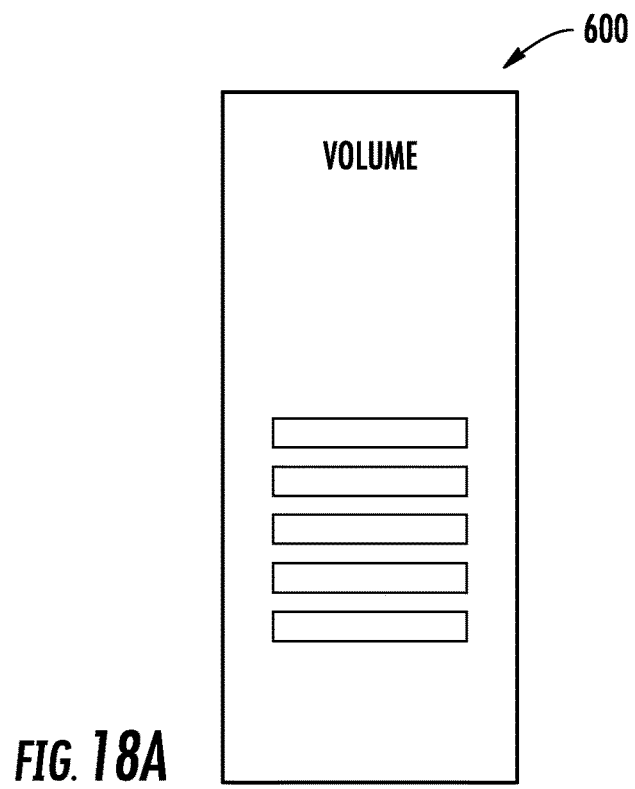
FIG. 18A is a representation of a notification that may be displayed on a display device.
Figure 18B:
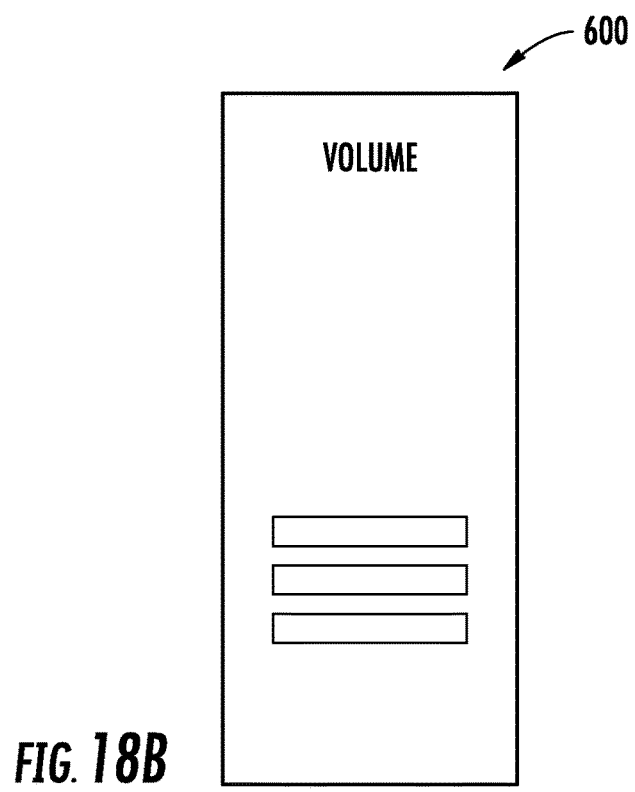
FIG. 18B is a representation of a notification that may be displayed on a display device.
Figure 18C:
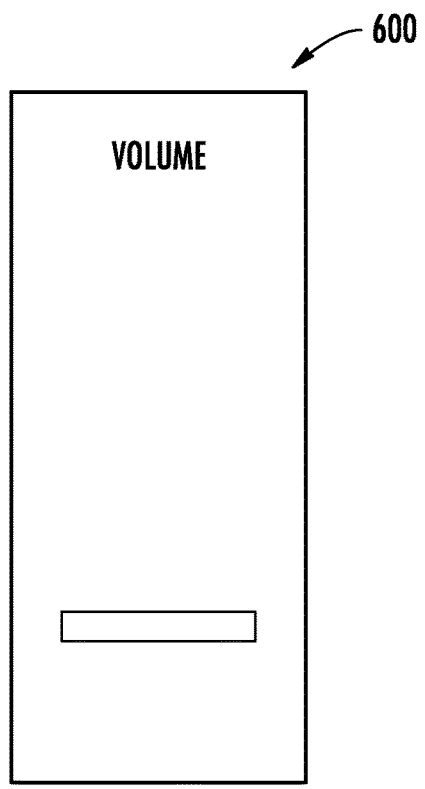
FIG. 18C is a representation of a notification that may be displayed on a display device.
Figure 18D:
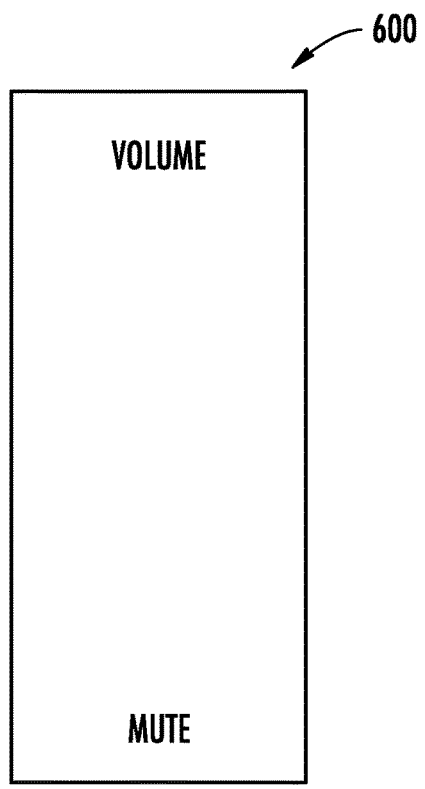
FIG. 18D is a representation of a notification that may be displayed on a display device.

Referring to FIG. 17D, when $T_1<D°$, the selection indicator 308 would begin to hover over the title of the next inactive sub-menu 306, which in FIG. 17D would be "Games." At this point, the menu 300 would begin to transition the old active sub-menu 304, which in FIG. 17D would be "Programs," to an inactive sub-menu 306 and would transition the next inactive sub-menu 306, which in FIG. 17D is "Games," to an active sub-menu. Since this action occurs when $T_1<D°$, the action corresponds to the peripheral device 100 moving to secondary functionality scheme 2 258. Additionally, this action may cause the threshold values $T_0, T_1, T_2, \ldots, T_n$, to be adjusted as described above. Referring to FIGS. 17D and 17E, it is understood that any inactive sub-menus 306 that appear below the current active sub-menu 304 may be accessed by decreasing the longitudinal tilt angle θ such that the $T_0<D°\leq T_1$. In one embodiment, the threshold value $T_1$ would be smaller in secondary functionality scheme 2 258 than in secondary functionality scheme 1 256. In this fashion, the user could easily navigate the current active sub-menu 304 using a wide range of possible longitudinal tilt angles θ and can still activate the inactive sub-menu 306, which in FIG. 17E is "Programs," by decreasing the longitudinal tilt angle θ to a point where $D°\leq T_1$.

In one embodiment, the lowest edge 410 of the menu 300 (and thus usually the lowest edge of any active sub-menus 304 or inactive sub-menus 306) would correspond to $T_0$, while the top edge of the menu 300 (and thus usually the top edge of any active sub-menus 304 or inactive sub-menus 306) would correspond to $T_n$. Additionally, the visual interfaces 414 between any inactive sub-menus 306 or between an active sub-menu 304 and an inactive sub-menu 306 would correspond to the appropriate threshold values $T_1, T_2, \ldots, T_{n-1}$, for that sub-menu's secondary functionality scheme 256, 258, 260. As shown in FIGS. 17A-17I, the visual interfaces 414 may change depending on the current active sub-menu 304, and therefore may change depending on the secondary functionality scheme 256, 258, 260. Therefore, it is understood how the threshold values $T_1, T_2, \ldots, T_{n-1}$, may change as the user increases the longitudinal tilt angle θ, as shown in the progression from FIG. 17A to FIG. 17G, or as the user decreases the longitudinal tilt angle θ, as shown in the progression from FIG. 17G to FIG. 17I. It is understood that fine control within a menu 300 may be effected by increasing the space between the threshold values $T_0, T_1, T_2, \ldots, T_n$, thus allowing a user to use more range of motion within a particular tilt direction.

It is understood that the selection indicator 308 may take many different forms, such as highlighting, color changes, or other forms. Additionally, the selection indicator 308 may create other visual (e.g. external lights on the peripheral device 100), audio (e.g. beeps or sounds from the computer 102), or tactile feedback (e.g. vibrations within the peripheral device 100) on a device other than the computer display screen. It is understood that the use of tactile feedback, such as vibrations, may allow a use with reduced vision capabilities to use the peripheral device 100 to better control a computer 102 or other device. Similarly, it is understood that the menu 300 or active sub-menu 304 being displayed may contain or be accompanied by various highlighting, colors, textures, or other visual, audio, or tactile feedback on the computer 102, external device 112, or peripheral device 100 so as to allow a user to better distinguish the current menu 300 or active sub-menu 304 being displayed.

When the user has tilted the peripheral device 100 such that the desired menu item 302 is highlighted by the selection indicator 308, the user may then engage that menu item 302. Engagement of a menu item 302 may occur through a button event or through peripheral device 100 tilting or twisting. In one embodiment, the user would engage the selected menu item 302 by pressing on a button, such as the first button 22 of a computer mouse 10. In another embodiment, the user would engage the selected menu item 302 by performing clockwise tilt. It is understood that other tilt and twist methods could be used to engage a selected menu item 302. Additionally, if the user were to continue increasing the longitudinal tilt angle θ such that the selection indicator 308 left the active sub-menu 304 and began to highlight an inactive sub-menu 306, than that inactive sub-menu 306 would transition to becoming an active sub-menu 306. Such transition may be instantaneous or may be gradual, accompanied by movement or animation, as shown in FIGS. 17A-17I.

In one embodiment, tilt or twist of the peripheral device 100 may directly adjust settings in the computer 102 or external device 112. When referring to "settings in the computer 102," it is understood to include, but not be limited to, operating system settings and individual program settings. In this fashion, tilting or twisting of the peripheral device 100 may adjust the volume, screen brightness, treble, bass, zoom or other adjustable setting within the computer 102 or external device 112. In another embodiment, tilting or twisting of the peripheral device 100 may switch between preset values for one or more adjustable settings within the computer 102 or external device 112. Furthermore, tilting or twisting of the peripheral device 100 may enable either button events or further tilting or twisting of the peripheral device 100 in another tilting or twisting direction to adjust the adjustable setting within the computer 102 or external device 112.

As an example, a user may tilt a peripheral device 100 connected to a computer 102 in a backwards tilting motion past the threshold value $T_0$. At this point, either nothing may be displayed on the computer display screen or the computer display device may display a menu or other indication that the tilting has exceeded the threshold value $T_0$ and that the peripheral device 100 is in a particular secondary functionality scheme 256, 258, 260. In another example, the "Programs" menu from FIG. 17A may appear. At that point, the user may begin to scroll the scroll actuator 24. In response to this particular button event while the peripheral device 100 is in that particular secondary functionality scheme 256, 258, 260, the computer may begin to adjust the volume of the computer 102. In one embodiment, when in another secondary functionality scheme 256, 258, 260, brightness or another adjustable setting can be controlled as described above for volume.

When the volume, or other adjustable setting, is being adjusted in this fashion, the computer display screen may display a notification window 600 as shown in FIGS. 18A-18D. As the user causes the adjustable setting to be adjusted, the notification window 600 may indicate the value of the adjustable setting. In the above example, as the user scrolls the scroll actuator 24 in a backwards direction (i.e. towards the rear surface 32 of the computer mouse 10) while the peripheral device 100 is being tilted into a particular secondary functionality scheme 256, 258, 260, the volume may be adjusted down from a high level to a low level, as seen in the progression from FIG. 18A to FIG. 18B, to FIG. 18C.

In an embodiment, at any point while the peripheral device is in the particular secondary functionality scheme 256, 258, 260, whether during the scrolling process or not, the user may press the scroll actuator 24 as a button, or may press another button on the device, which would then cause the computer's mute setting to switch from off to on or from on to off. As shown FIG. 18D, the user had caused a button event while the peripheral device 100 was in a particular secondary functionality 256, 258, 260, which then caused the mute setting to switch from off to on. Likewise, a user performing the same action while the mute setting of the computer is set to on would result in the mute setting being adjusted to off, which may result in a notification window 600 being displayed, such as those depicted in FIG. 18A, 18B, or 18C.

Position Tracking

In one embodiment, the peripheral device 100 is capable of tracking its 3-D position using the one or more tilt sensors 104 alone, or using the one or more tilt sensors 104 in conjunction with the X-Y sensor 12. Referring to the embodiment of FIG. 20, the peripheral device 100 is capable of providing additional secondary functionality schemes 256, 258, 260 based on the detected distance $D^1$ from a tare plane 700 (i.e. a plane formed by the intersection of two of the tare lateral axis 206, the tare longitudinal axis 208, and the tare vertical axis 210). Two tare planes 700 are shown in FIG. 20: a tare plane 700 formed by the intersection of the tare lateral axis 206 and the tare vertical axis 210; and a tare plane 700 formed by the intersection of the tare longitudinal axis 208 and the tare vertical axis 210. While not shown in FIG. 20, it is understood that an additional tare plane 700 may exist at the intersection of the tare lateral axis 206 and the tare longitudinal axis 206. In FIG. 20, that tare plane 700 is assumed to reside on the support surface 14. FIG. 20 additionally shows the detected distances $D^1$ between the peripheral device 100 and the tare planes 700.

As used herein, the term detected distance $D^1$ may refer to the detected distance $D^1$ to any of the three tare planes, as indicated generally in FIG. 20.

In such embodiments, the detected distance $D^1$ would operate similarly to the detected tilt angle $D°$ described above, with various threshold values operating in various position directions (i.e. positive longitudinally, negative longitudinally, positive laterally, negative laterally, positive vertically, or negative vertically), rather than tilt directions. In this fashion, the detected distance $D^1$ between the peripheral planes (i.e. a plane formed by the intersection of two of the peripheral lateral axis 200, the peripheral longitudinal axis 202, and the peripheral vertical axis 204) of the peripheral device 100 and the tare plane would allow the peripheral device 100 to enter additional secondary functionality 262 and secondary functionality schemes 256, 258, 260 when the detected distance $D^1$ is greater than certain threshold values $T_0, T_1, T_2, \ldots, T_n$. It is understood that the applicable disclosure for the tilt detection and software functionality as disclosed above may apply as appropriate to this position tracking.

For ease of figure discernment, FIG. 20 is drawn such that the detected distances $D^1$ are measured form the tare planes 700 to the surfaces of the peripheral device 100. It is understood that the same position tracking functionality can be obtained by measuring to the surfaces of the peripheral device 100 as can be obtained by measuring to the peripheral planes described above. In some embodiments, the dimensions of the peripheral device 100 may be known such that the true distance from the peripheral planes to the tare planes 700 can be calculated from a detected distance $D^1$ based off of the distance between the tare planes 700 and the surfaces of the peripheral device 100. For purposes of interpreting FIG. 20, it is understood that FIG. 20 is intended to also include the embodiment where the detected distance $D^1$ are measured from the tare planes 700 to the peripheral planes, as described above.

In one embodiment, it is understood that a combination of tilt detection and position tracking can be used to greatly increase the control of a computer 102 or an external device 112. In another embodiment, the peripheral device 100 can be used to open menus or enter commands by being moved and/or tilted longitudinally, laterally, and/or vertically. In still another embodiment, the peripheral device 100 can be used to enter a combination or passcode by replicating pre-defined longitudinal, lateral, and vertical movements and tilting.

Customization

In one embodiment, the peripheral device 100 will work with software readable to the computer 102. In another embodiment, the software may be capable of customizing the menus 300 and menu items 302 that appear when a secondary functionality 262 is engaged. Furthermore, the software may be capable of customizing the threshold values $T_0, T_1, T_2, \ldots, T_n$ of each tilt direction and position direction. The software may also be capable of customizing the actions that occur for the various button events for each possible permutation of secondary functionalities 262. The software may also be capable of customizing the actions that are taken when the peripheral device enters or exits various functionalities (i.e. primary functionality 254 or secondary functionality schemes 256, 258, 260). The software may be able to further customize the peripheral device 100 to the user's preferences.

The headings used in this description are inserted for readability purposes only and are not to be construed as limiting, in any way, the contents of this disclosure.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. A computer mouse for use on a support surface, the computer mouse comprising:
    a tilt sensor for measuring a longitudinal or lateral tilt of the computer mouse with respect to the support surface and producing a signal based on the longitudinal or lateral tilt, while at least a portion of the computer mouse remains in contact with the support surface; and
    a processor that receives the signal and is configured such that a primary function is performed when the signal indicates that the longitudinal or lateral tilt of the mouse exceeds a first threshold value and a first secondary function is performed when the signal indicates that the longitudinal or lateral tilt of the mouse exceeds a second threshold value that is beyond the first threshold value.

2. The computer mouse of claim 1, wherein the processor is further configured such that a second secondary function is performed when the signal indicates that the longitudinal or lateral tilt of the mouse exceeds a third threshold value that is beyond the second threshold value.

3. The computer mouse of claim 1, wherein the processor is further configured such that n secondary functions are performed when the signal indicates that the longitudinal or lateral tilt of the mouse exceeds n+1 threshold value that is beyond n threshold value, wherein n is greater than or equal to 2.

4. The computer mouse of claim 1, further comprising a position sensor that detects the position of the mouse with respect to the support surface.

5. The computer mouse of claim 1, wherein the processor is further configured such that a second secondary function is performed when the position of the mouse with respect to the support surface exceeds a distance threshold value.

6. The computer mouse of claim 1, wherein the tilt sensor comprises a pressure sensor, a laser light, a magnetic sensor, an electric sensor, a RADAR sensor, or an acoustic sensor.

7. A computer device comprising:
    at least one tilt sensor located within a computer mouse for measuring a longitudinal tilt and a lateral tilt of the computer mouse with respect to the support surface and producing a signal based on the longitudinal or lateral tilt, while at least a portion of the computer mouse remains in contact with the support surface; and
    a processor that receives the signal and is configured such that:
        a primary function is performed when the signal indicates that either: the longitudinal tilt of the mouse exceeds a first longitudinal threshold value; or the lateral tilt of the mouse exceeds a first lateral threshold value; and
        a first secondary function is performed when the other of the signal indicates that the longitudinal tilt of the mouse exceeds the first longitudinal threshold value or the lateral tilt of the mouse exceeds the first lateral threshold value.

8. The computer device of claim 7, wherein the processor is further configured such that n secondary functions are performed when the signal indicates that the longitudinal or lateral tilt of the mouse exceeds n+1 longitudinal or lateral threshold values, respectively, the n+1 longitudinal threshold values being beyond n lateral or longitudinal threshold values, respectively, and wherein n is greater than or equal to 1.

9. The computer device of claim 7, wherein the processor is located within the computer mouse.

10. The computer device of claim 7, wherein the processor is located within a computer's central processing unit.

11. A computer mouse for use on a support surface, the computer mouse comprising:
    a tilt sensor for measuring a longitudinal or lateral tilt of the computer mouse with respect to the support surface and producing a signal based on the longitudinal or lateral tilt, while at least a portion of the computer mouse remains in contact with the support surface; and
    a processor that receives the signal and is configured such that a first menu is opened when the tilt sensor registers from the signal the longitudinal tilt as being beyond a first threshold value and the first menu is closed when the longitudinal tilt is no longer registered from the signal as being beyond the first threshold value.

12. The computer mouse of claim 11, wherein the processor is further configured such that a second menu is opened when the tilt sensor registers from the signal the longitudinal tilt as being beyond a second threshold value and the second menu is closed when the longitudinal tilt is no longer registered from the signal as being beyond the second threshold value, the second threshold value being beyond the first threshold value.

13. The computer mouse of claim 11, wherein the processor is further configured such that an n menu is opened when the tilt sensor registers from the signal a longitudinal tilt as being beyond an n threshold value and the n menu is closed when the longitudinal tilt is no longer registered from the signal as being beyond the n threshold value, wherein n is greater than or equal to 2.

14. The computer mouse of claim 11, wherein the processor is further configured such that a sub-menu is opened when the tilt sensor registers from the signal a longitudinal tilt as being beyond a second threshold value and the sub-menu is closed when the longitudinal tilt is no longer registered from the signal as being beyond the second threshold value, the second threshold value being beyond the first threshold value.

15. The computer mouse of claim 11, wherein the processor is further configured such that a menu item is chosen when the tilt sensor registers from the signal a lateral tilt as being beyond a first lateral threshold value.

16. The computer mouse of claim 15, wherein the processor is further configured such that the menu item is selected by pressing a corresponding button, key, or by a specific tilt or twist, as indicated near the menu item.

17. The computer mouse of claim 16, wherein the processor is further configured such that the menu item is selected without pressing a control.

18. The computer mouse of claim 11, wherein the processor is further configured such that the computer mouse can switch between menus based on the detected longitudinal or lateral tilt angle from the signal.

19. The computer mouse of claim 11, further comprising a position sensor that detects the position of the mouse with respect to the support surface.

20. The computer mouse of claim 19, wherein the processor is further configured such that a second menu is opened when the position of the mouse with respect to the support surface exceeds a distance threshold value.

* * * * *